(12) United States Patent
Wu et al.

(10) Patent No.: US 10,742,302 B2
(45) Date of Patent: Aug. 11, 2020

(54) WIRELESS COMMUNICATION DEVICE TRANSCEIVING SIGNALS BY USING CARRIER AGGREGATION IN MULTI INPUT MULTI OUTPUT SYSTEM

(71) Applicant: SAMSUNG ELECTRONICS CO., LTD., Suwon-si (KR)

(72) Inventors: Chia-Hsin Wu, Seongnam-si (KR);
Thomas Byunghak Cho, Seongnam-si (KR); Tae-wan Kim, Yongin-si (KR);
Joung-hyun Yim, Hwaseong-si (KR);
In-young Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/375,385

(22) Filed: Apr. 4, 2019

(65) Prior Publication Data

US 2019/0326977 A1    Oct. 24, 2019

(30) Foreign Application Priority Data

Apr. 19, 2018  (KR) ........................ 10-2018-0045742

(51) Int. Cl.
*H04B 7/08* (2006.01)
*H04B 7/0413* (2017.01)
*H04B 7/06* (2006.01)

(52) U.S. Cl.
CPC ......... *H04B 7/0865* (2013.01); *H04B 7/0413* (2013.01); *H04B 7/0613* (2013.01); *H04B 7/0697* (2013.01)

(58) Field of Classification Search
CPC .. H04B 7/0865; H04B 7/0413; H04B 7/0697; H04B 7/0613
(Continued)

(56) References Cited

U.S. PATENT DOCUMENTS 9,178,669 B2  11/2015  Fernando
9,252,827 B2   2/2016  Gudem et al.
(Continued)

OTHER PUBLICATIONS

Tsung-Ming Chen et al. "An 802.11ac Dual-Band Reconfigurable Transceiver Supporting up to Four VHT80 Spatial Streams with 116fS$_{rms}$Jitter Frequency Synthesizer and Integrated LNA/PA Delivering 256QAIVI 19dBm per Stream Achieving 1.733Gb/s PHY Rate" IEEE International Solid-State Circuits Conference, 2017 (pp. 126-128).

*Primary Examiner* — Kevin M Burd
(74) *Attorney, Agent, or Firm* — Sughrue Mion, PLLC

(57) ABSTRACT

A wireless communication device for transceiving signals by using carrier aggregation is provided. The wireless communication device includes a first antenna configured to transmit a first signal to an outside of the wireless communication device or receive a second signal from the outside; a first transmitter connected to the first antenna via a first node and configured to generate the first signal by combining plural transmitting carrier signals received over a plural transmitting carriers; and a first receiver connected to the first antenna via the first node and configured to divide the second signal into a plural receiving carrier signals received over a plural receiving carriers. The first receiver includes a first receiving amplifier commonly connected to a plural carrier receivers configured to amplify the second signal received from the first antenna and to divide the receiving carrier signals, respectively.

13 Claims, 20 Drawing Sheets

(58) Field of Classification Search
USPC .......................................................... 375/267
See application file for complete search history.

(56) References Cited

U.S. PATENT DOCUMENTS

| | | | |
|---|---|---|---|
| 9,312,888 B2 | 4/2016 | Weissman et al. | |
| 9,344,318 B2 | 5/2016 | Nilsson et al. | |
| 9,503,173 B2 | 11/2016 | McCarthy et al. | |
| 9,621,327 B2 | 4/2017 | Chang et al. | |
| 9,825,660 B2 | 11/2017 | Wloczysiak et al. | |
| 2010/0183106 A1* | 7/2010 | Beidas .................... | H04B 1/126 375/350 |
| 2013/0265892 A1* | 10/2013 | Fernando ................ | H04L 5/001 370/252 |
| 2014/0273887 A1 | 9/2014 | Black et al. | |
| 2015/0087245 A1* | 3/2015 | Hadji-Abdolhamid ...................... | H04B 1/0057 455/77 |
| 2015/0296515 A1 | 10/2015 | Pehlivanoglu | |
| 2017/0040947 A1* | 2/2017 | Chang .................... | H04B 1/006 |
| 2017/0077983 A1 | 3/2017 | Ella et al. | |
| 2017/0244430 A1 | 8/2017 | Black et al. | |
| 2017/0302328 A1 | 10/2017 | Obiya et al. | |

\* cited by examiner

WIRELESS COMMUNICATION DEVICE TRANSCEIVING SIGNALS BY USING CARRIER AGGREGATION IN MULTI INPUT MULTI OUTPUT SYSTEM

CROSS-REFERENCE TO RELATED APPLICATION

This application claims priority from Korean Patent Application No. 10-2018-0045742, filed on Apr. 19, 2018, in the Korean Intellectual Property Office, the disclosure of which is incorporated by reference herein in its entirety.

BACKGROUND

1. Field

Apparatuses, devices and articles of manufacture consistent with the present disclosure relate to a wireless communication device, and more particularly, to a wireless communication device transceiving signals by using carrier aggregation in a multiple input multiple output (MIMO) system.

2. Description of Related Art

Carrier aggregation may refer to a usage of multiple carriers together in transmission to or from a single wireless communication device. A frequency domain transmitted by one carrier may be referred to as a frequency channel and the amount of data transmitted via wireless channels may be increased due to the carrier aggregation supporting multiple frequency channels. In carrier aggregation, the frequency channels via which data is transmitted may be variously arranged, and thus, a transmitter, a receiver or a transceiver of the wireless communication device may need to support various arrangements of the frequency channels.

In addition, the MIMO system may use multiple antennas at transmitting ends and receiving ends to support a high transmission rate within limited transmission power and frequency resources, and may be widely used in orthogonal frequency division multiplexing (OFDM)-based wireless communication systems. The MIMO system may be capable of performing high-speed data transmission by transmitting and receiving signals by using a plurality of antennas at both the transmitting ends and the receiving ends. Since independent signals are simultaneously transmitted via respective antennas at the transmitting end of the MIMO system, a technique of effectively extracting the independent signals from the receiving ends may greatly affect the performance of a whole system.

SUMMARY

It is an aspect to provide a wireless communication device capable of increasing data throughput by processing a plurality of carriers via a single antenna.

According to an aspect of an example embodiment, there is provided a wireless communication device for transceiving signals by using carrier aggregation, the wireless communication device including a first antenna configured to transmit a first signal to an outside of the wireless communication device or receive a second signal from the outside; a first transmitter connected to the first antenna via a first node and configured to generate the first signal by combining a plurality of transmitting carrier signals received over a plurality of transmitting carriers; and a first receiver connected to the first antenna via the first node and configured to divide the second signal into a plurality of receiving carrier signals received over a plurality of receiving carriers, wherein the first receiver comprises a first receiving amplifier commonly connected to a plurality of carrier receivers configured to amplify the second signal received from the first antenna and to divide the plurality of receiving carrier signals, respectively.

According to another aspect of an example embodiment, there is provided a wireless communication device for transceiving signals by using carrier aggregation, the wireless communication device including a first antenna configured to transmit a first signal to an outside of the wireless communication device; a first transmitter configured to up-convert a first transmitting carrier signal to a first channel and output the first transmitting carrier signal that is up-converted; a second transmitter configured to up-convert a second transmitting carrier signal to a second channel and output the second transmitting carrier signal that is up-converted; an adder configured to generate the first signal by combining the first transmitting carrier signal with the second transmitting carrier signal; and a first transmitting amplifier configured to amplify the first signal and output the first signal that is amplified to the first antenna.

According to another aspect of an example embodiment, there is provided a wireless communication device for transceiving signals by using carrier aggregation, the wireless communication device including a first antenna configured to receive a first signal from an outside of the wireless communication device; a second antenna configured to receive a second signal from the outside; a first receiver connected to the first antenna and configured to extract a first receiving carrier signal of a first channel from the first signal; a second receiver connected to the second antenna and configured to extract a second receiving carrier signal of a second channel from the second signal; and a first receiving mixer connected between the first receiver and the second receiver and configured to down-convert the first signal based on a first frequency signal and output the first signal that is down-converted to the second receiver.

BRIEF DESCRIPTION OF THE DRAWINGS

Embodiments will be more clearly understood from the following detailed description taken in conjunction with the accompanying drawings in which.

DETAILED DESCRIPTION

Figure 1:
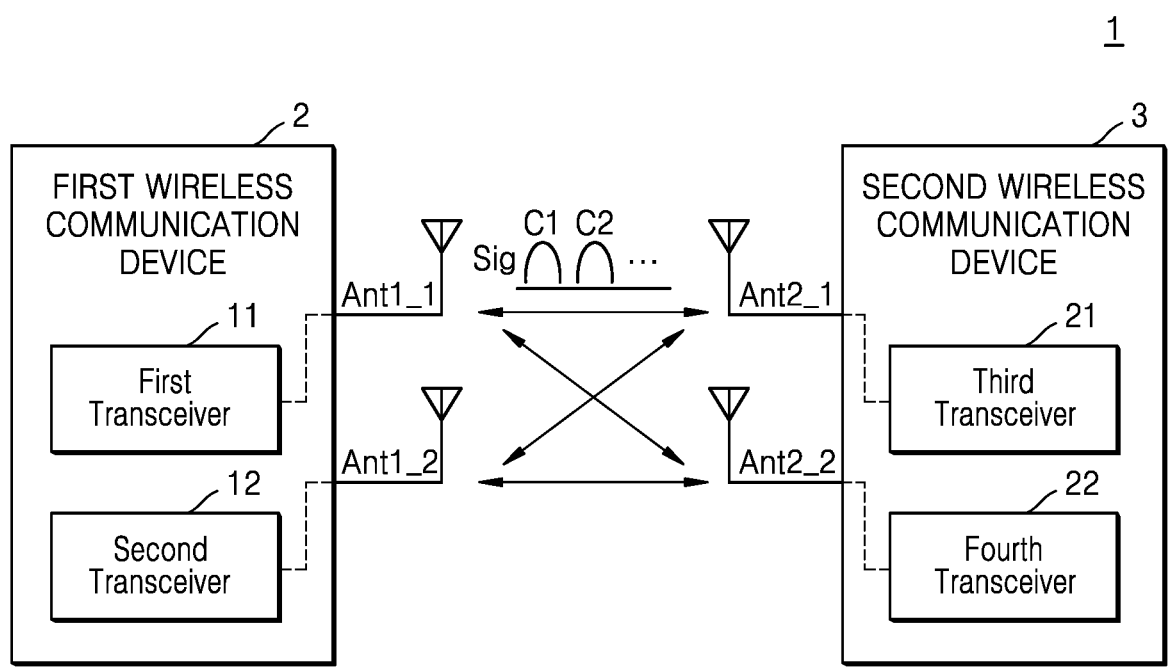
FIG. 1 is a block diagram illustrating a wireless communication system according to an embodiment.

FIG. 1 is a block diagram illustrating a wireless communication system 1 according to an embodiment.

Referring to FIG. 1, the wireless communication system 1 may include a first wireless communication device 2 and a second wireless communication device 3. The wireless communication system 1 may include, an a non-limiting example, a long term evolution (LTE) system, an LTE-advance (LTE-A) system, a code division multiple access (CDMA) system, a global system for mobile communications (GSM) system, a wireless local area network (WLAN) system, a wireless fidelity (WiFi) system, a Bluetooth low energy (BLE) system, a ZigBee system, a near field communication (NFC) system, a magnetic secure transmission (MST) system, a radio frequency (RF) system, or a body area network (BAN) system. The first wireless communication device 2 and the second wireless communication device 3 may refer to various devices that are capable of communicating with each other to transmit and receive data and/or control information. For example, the first wireless communication device 2 and the second wireless communication device 3 may be configured as either user equipment (UE) or a base station. The UE may be a fixed or mobile wireless communication device and may be referred to as terminal equipment, a mobile station (MS), a mobile terminal (MT), a user terminal (UT), a subscriber station (SS), a wireless device, a handheld device, or the like. A base station (BS) may be generally referred to as a fixed station that communicates with the UE and/or another base station, and may be referred to as a Node B, an evolved-Node B (eNB), a base transceiver system (BTS), or the like. In another example, the first and second wireless communication devices 2 and 3 may be configured as any one of a client and an access point (AP). The client may establish a communication link with the AP based on WiFi communication.

The first and second wireless communication devices 2 and 3 may communicate with each other by using a multiple input multiple output (MIMO) method. To this end, the first wireless communication device 2 may include a first antenna Ant1_1 and a second antenna Ant1_2, and the second wireless communication device 3 may include a third antenna Ant2_1 and a fourth antenna Ant2_2. FIG. 1 illustrates an embodiment in which the first wireless communication device 2 may include two antennas, that is, the first antenna Ant1_1 and the second antenna Ant1_2, and the second wireless communication device 3 may include two antennas, that is, the third antenna Ant2_1 and the fourth antenna Ant2_2, but the embodiment is not limited thereto. In some embodiments, each of the first wireless communication device 2 and the second wireless communication device 3 may include more than two antennas.

Each of the first wireless communication device 2 and the second wireless communication device 3 may operate as any one of a transmitting device and a receiving device. When the first wireless communication device 2 operates as a transmitting device, the second wireless communication device 3 may operate as a receiving device. When the second wireless communication device 3 operates as a transmitting device, the first wireless communication device 2 may operate as a receiving device.

A wireless communication network between the first wireless communication device 2 and the second wireless communication device 3 may support communication among multiple users by sharing available network resources. For example, in the wireless communication network, information may be transferred in various methods such as code division multiple access (CDMA), frequency division multiple access (FDMA), time division multiple access (TDMA), orthogonal frequency division multiple access (OFDMA), and single carrier frequency division multiple access (SC-FDMA).

The first and second wireless communication devices 2 and 3 may communicate by using a plurality of carriers combined as a first signal Sig by using carrier aggregation (CA). In CA, carriers used for transmitting a frequency domain and a signal by the first and second wireless communication devices 2 and 3 may be referred to as transmitting carriers, and carriers used for receiving by the first and second wireless communication devices 2 and 3 may be referred to as receiving carriers. In addition, in this specification, the frequency domain transmitted by the transmitting carrier or received by the receiving carrier may be referred to as a channel, the signal transmitted by the transmitting carrier may be referred to as a transmitting carrier signal, and a signal received by the receiving carrier may be referred to as a receiving carrier signal.

The first wireless communication device 2 may include a first transceiver 11, a second transceiver 12, the first antenna Ant1_1, and the second antenna Ant1_2. The first transceiver 11 and the second transceiver 12 may each be connected to one antenna. For example, the first transceiver 11 may be connected to the first antenna Ant1_1, and the second transceiver 12 may be connected to the second antenna Ant1_2. When the first wireless communication device 2 operates as the transmitting device, the first transceiver 11 and the second transceiver 12 may operate as transmitters, and when the first wireless communication device 2 operates as the receiving device, the first transceiver 11 and the second transceiver 12 may operate as receivers. In this specification, a case in which the first wireless communication device 2 operates as a receiving device may be referred to as a receiving mode, and a case in which the first wireless communication device 2 operates as a transmitting device may be referred to as a transmitting mode.

In the transmitting mode, the first transceiver 11 may generate the first signal Sig by combining a first carrier signal C1 with a second carrier signal C2, and output the generated first signal Sig to the second wireless communication device 3. In the receiving mode, the first transceiver 11 may extract not only the first carrier signal C1 but also the second carrier signal C2 from the first signal Sig. According to the technical idea of the inventive concept, the first transceiver 11 may transmit not only one carrier signal but also a plurality of carrier signals by combining the plurality of carrier signals in the transmitting mode, and may respectively extract not only one carrier signal but also the plurality of carrier signals from the first signal Sig in the receiving mode. Similarly, the second transceiver 12 may transmit not only one carrier signal but also a plurality of carrier signals by combining the plurality of carrier signals in the transmitting mode, and may respectively extract not only one carrier signal but also the plurality of carrier signals in the receiving mode. Accordingly, the first and second wireless communication devices 2 and 3 may transmit and receive more carrier signals by using the same number of antennas, and thus, data throughput may be increased. The second transceiver 12 may be substantially the same as or similar to the first transceiver 11 and further description thereof is omitted for conciseness.

The second wireless communication device 3 may include a third transceiver 21, a fourth transceiver 22, the third antenna Ant2_1, and the fourth antenna Ant2_2. Since the second wireless communication device 3 is substantially the same as or similar to the first wireless communication device 2, a description thereof is omitted conciseness.

Figure 2:
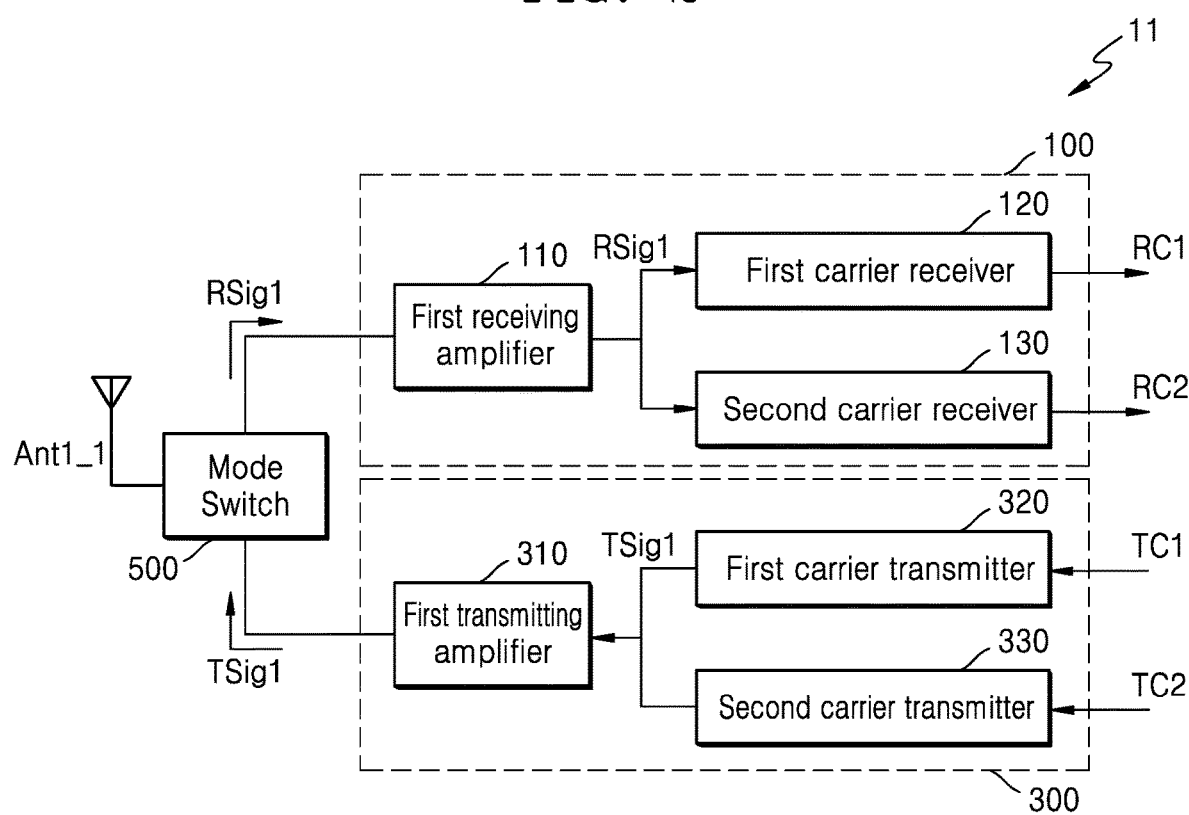
FIG. 2 is a block diagram illustrating a transceiver according to an embodiment.

FIG. 2 is a block diagram illustrating the first transceiver 11 according to an embodiment.

Referring to FIG. 2, the first transceiver 11 may include a first receiver 100, a first transmitter 300, and a mode switch 500, and may be connected to the first antenna Ant1_1. The first receiver 100 may include a first receiving amplifier 110, a first carrier receiver 120, and a second carrier receiver 130. The first transmitter 300 may include a first transmitting amplifier 310, a first carrier transmitter 320, and a second carrier transmitter 330.

In the receiving mode, the mode switch 500 may connect the first receiving amplifier 110 to the first antenna Ant1_1 so that the first receiving amplifier 110 receives a first receiving signal RSig1 (for example from the second wireless communication device 3 in FIG. 1). The first receiving amplifier 110 may amplify the first receiving signal RSig1 and output the amplified first receiving signal RSig1 to the first carrier receiver 120 and the second carrier receiver 130. The first carrier receiver 120 may extract the first receiving carrier signal RC1 from the amplified first receiving signal RSig1 and output the extracted first receiving carrier signal RC1 to the internal circuit. The second carrier receiver 130 may extract the second received carrier signal RC2 from the amplified first receiving signal RSig1 and output the second receiving carrier signal RC2 to the internal circuit. According to an embodiment, a large amount of transmission data may be secured by extracting a plurality of receiving carrier signals, that is, the first and second receiving carrier signals RC1 and RC2, from the first receiving signal RSig1 received from one first antenna Ant1_1.

In the transmitting mode, the first carrier transmitter 320 may receive a first transmitting carrier signal TC1 and the second carrier transmitter 330 may receive a second transmitting carrier signal TC2. The first carrier transmitter 320 may process the first transmitting carrier signal TC1, and the second carrier transmitter 330 may process the second transmitting carrier signal TC2. A first transmitting signal TSig1 may be generated by combining the processed first transmitting carrier signal TC1 with the processed second transmitting carrier signal TC2. The first transmitting signal TSig1 may be amplified by the first transmitting amplifier 310. In the transmitting mode, The mode switch 500 may connect the first transmitting amplifier 310 to the first antenna Ant1_1, and the first transmitting amplifier 310 may transmit the amplified first transmitting signal TSig1 to the outside (for example, the second wireless communication device 3 in FIG. 1) via the first antenna Ant1_1. According to an embodiment, a large amount of transmission data may be secured with the same number of antennas by combining the first and second transmitting carrier signals TC1 and TC2, and transmitting the combined first and second transmitting carrier signals TC1 and TC2 to the outside via one first antenna Ant1_1.

FIG. 2 illustrates an embodiment in which there are two carrier receivers, that is, the first and second carrier receivers 120 and 130, and two carrier transmitters, that is, the first and second carrier transmitters 320 and 330, but the embodiment is not limited thereto, and in some embodiments, there may be more than two carrier receivers, and more than two carrier transmitters.

Figure 3:
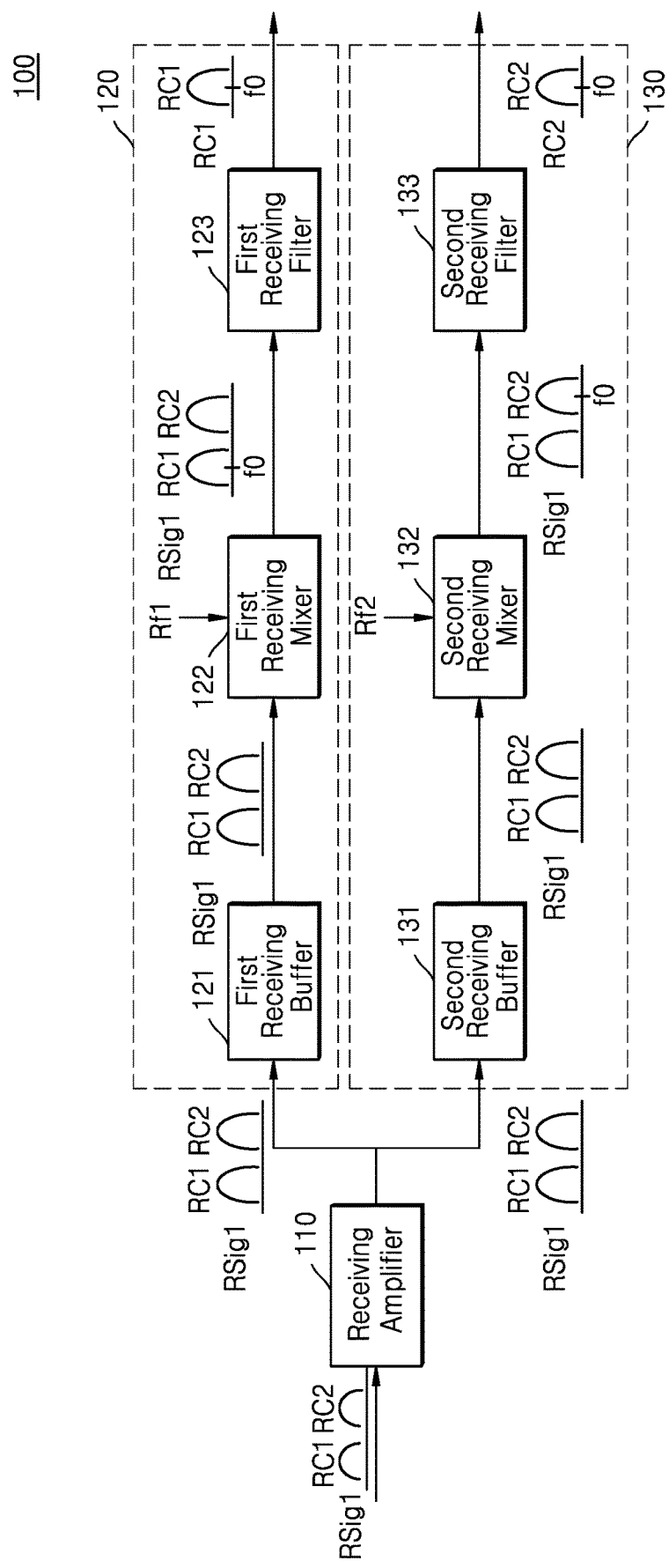
FIG. 3 is a block diagram illustrating a receiver according to an embodiment.

FIG. 3 is a block diagram illustrating the first receiver 100 according to an embodiment. Contents overlapping with those given with reference to FIG. 2 are omitted for conciseness.

Referring to FIG. 3, the first receiver 100 may include the first receiving amplifier 110, the first carrier receiver 120, and the second carrier receiver 130; the first carrier receiver 120 may include a first receiving buffer 121, a first receiving mixer 122, and a first receiving filter 123; and the second carrier receiver 130 may include a second receiving buffer 131, a second receiving mixer 132, and a second receiving filter 133.

The first receiving amplifier 110 may amplify the first receiving signal RSig1. In one example, the first receiving amplifier 110 may be a low noise amplifier (LNA). The amplified first receiving signal RSig1 may be buffered by the first receiving buffer 121 and be input to the first receiving mixer 122. The first receiving mixer 122 may use a first receiving frequency signal Rf1 received from a control circuit (not shown) to move the buffered first receiving signal RSig1 in the frequency domain so that the first receiving carrier signal RC1 of the buffered first receiving signal RSig1 is located at a first frequency f0. In one embodiment, the first receiving mixer 122 may down-convert the first receiving signal RSig1 in the frequency domain based on the first receiving frequency signal Rf1, and to this end, may include an amplifier and a multiplier. The first receiving filter 123 may remove unwanted components (for example, the second receiving carrier signal RC2) by filtering the down-converted first receiving signal RSig1 and generate the first receiving carrier signal RC1. In one example, the first receiving filter 123 may be a low pass filter (LPF).

The second receiving buffer 131 may receive and buffer the amplified first receiving signal RSig1. The buffered first receiving signal RSig1 may be input to the second receiving mixer 132, and the second receiving mixer 132 may move the first receiving signal RSig1 in the frequency domain by using a second receiving frequency signal Rf2 received from the control circuit (not shown) so that the second receiving carrier signal RC2 of the buffered first receiving signal RSig1 is located at the first frequency f0. In one embodiment, the second receiving mixer 132 may down-convert the first receiving signal RSig1 in the frequency domain based on the second receiving frequency signal Rf2, and to this end, may include an amplifier and a multiplier. The second receiving filter 133 may remove unwanted components (for example, the first receiving carrier signal RC1) by filtering the down-converted first receiving signal RSig1 and generate the second receiving carrier signal RC2. In one example, the second receiving filter 133 may be an LPF.

Figure 4A:
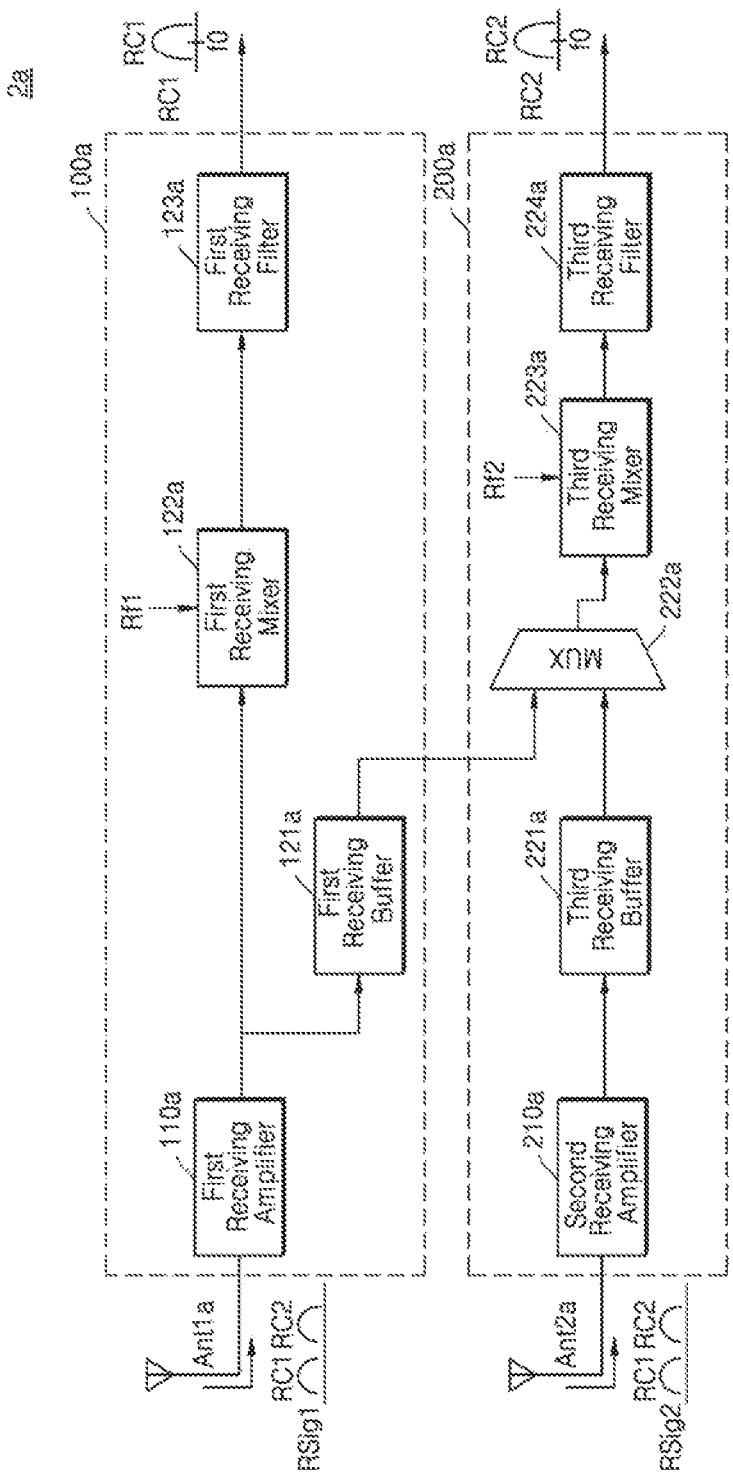
FIG. 4A is a block diagram illustrating a wireless communication device according to an embodiment.

FIG. 4A is a block diagram illustrating a wireless communication device 2a according to an embodiment.

Referring to FIG. 4A, the wireless communication device 2a may include a first receiver 100a and a second receiver 200a. The first receiver 100a may be connected to a first antenna Ant1a, and the second receiver 200a may be connected to a second antenna Ant2a. The first receiver 100a may include a first receiving amplifier 110a, a first receiving buffer 121a, a first receiving mixer 122a, and a first receiving filter 123a. The second receiver 200a may include a second receiving amplifier 210a, a third receiving buffer 221a, a multiplexer (MUX) 222a, a third receiving mixer 223a, and a third receiving filter 224a. In one example, the first receiver 100a may be included in the first transceiver 11 in FIG. 1, and the second receiver 200a may be included in the second transceiver 12 in FIG. 1.

The first receiver 100a may receive the first receiving signal RSig1 via the first antenna Ant1a. The first receiving amplifier 110a may amplify the received first receiving signal RSig1 and output the amplified first receiving signal RSig1 to the first receiving mixer 122a and the first receiving buffer 121a. The first receiving mixer 122a and the first receiving filter 123a may extract the first receiving carrier signal RC1 from the amplified first receiving signal RSig1, in a similar manner as described with reference to FIG. 3. The first receiving buffer 121a may output the amplified first receiving signal RSig1 to the MUX 222a.

The second receiver 200a may receive a second receiving signal RSig2 via the second antenna Ant2a. The second receiving amplifier 210a may amplify the received second receiving signal RSig2 and output the amplified second receiving signal RSig2 to the third receiving buffer 221a. The third receiving buffer 221a may buffer the amplified second receiving signal RSig2 and output the buffered second receiving signal RSig2 to the MUX 222a.

The MUX 222a may selectively output to the third receiving mixer 223a any one of the first receiving signal RSig1 received from the first receiving buffer 121a and the second receiving signal RSig2 received from the third receiving buffer 221a. Both the first receiving signal RSig1 and the second receiving signal RSig2 may include information about the second receiving carrier signal RC2. Thus, not only the second receiving signal RSig2 received via the second antenna Ant2a but also the first receiving signal RSig1 received via the first antenna Ant1a may be used to extract the second receiving carrier signal RC2. The third receiving mixer 223a may down-convert the first receiving signal RSig1 or the second receiving signal RSig2 received from the MUX 222a in the frequency domain based on the second receiving frequency signal Rf2, and the third receiving filter 224a may remove unwanted components (for example, the first receiving carrier signal RC1) by filtering the down-converted first receiving signal RSig1 or the down-converted second receiving signal RSig2, and generate the second receiving carrier signal RC2. In one example, the third receiving filter 224a may be an LPF.

Although not illustrated in FIG. 4A, the first receiver 100a may further include a second carrier receiver connected to the first receiving amplifier 110a in addition to a first carrier receiver which includes the first receiving buffer 121a, the first receiving mixer 122a, and the first receiving filter 123a, similar to the second carrier receiver 130 as illustrated in FIG. 3. In such a configuration, an output of the first receiving amplifier 110a would be input to the second receiving buffer 131 of the second carrier receiver. The remaining components of the second carrier receiver are illustrated in FIG. 3, and repeated description thereof is omitted for conciseness.

The wireless communication device 2a according to an embodiment may determine signal transmission routes differently according to a receiving ratio of a carrier. In one example, when the receiving ratio (RSig1 to RSig2) is such that a level of the second receiving signal RSig2 is low, the wireless communication device 2a may control the MUX 222a to obtain the second receiving carrier signal RC2 from the first receiving signal RSig1. In another example, when the receiving ratio (RSig1 to RSig2) is such that the level of the second receiving signal RSig2 is not low, the wireless communication device 2a may control the MUX 222a to obtain the second receiving carrier signal RC2 from the second receiving signal RSig2.

Figure 4B:
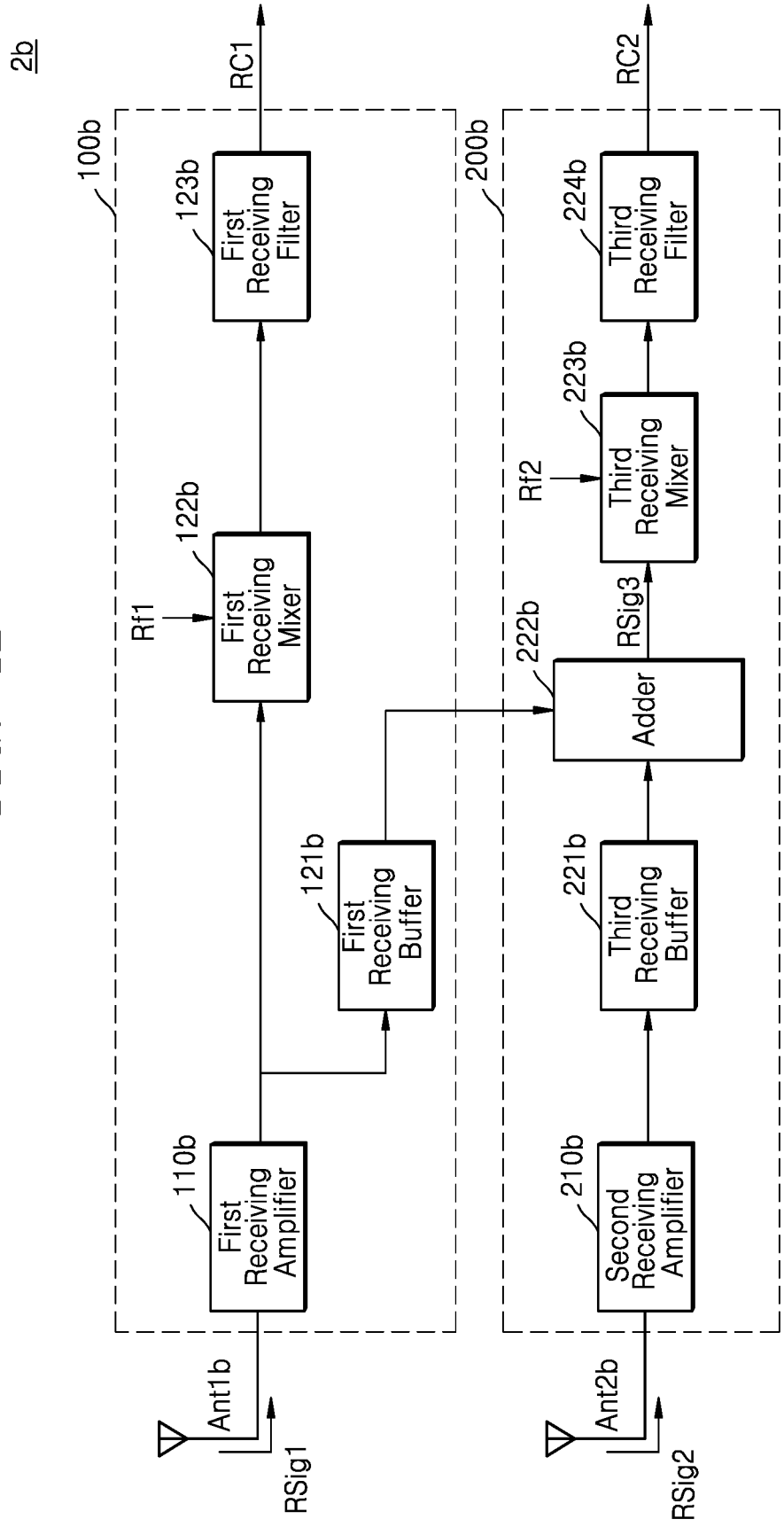
FIG. 4B is a block diagram illustrating a wireless communication device according to an embodiment.

FIG. 4B is a block diagram illustrating a wireless communication device 2b according to an embodiment. Contents overlapping with those given with reference to FIG. 4A are omitted for conciseness.

Referring to FIG. 4B, the wireless communication device 2b may include a first receiver 100b and a second receiver 200b. The first receiver 100b may be connected to a first antenna Ant1b, and the second receiver 200b may be connected to a second antenna Ant2b. The first receiver 100b may include a first receiving amplifier 110b, a first receiving buffer 121b, a first receiving mixer 122b, and a first receiving filter 123b. The second receiver 200b may include a second receiving amplifier 210b, a third receiving buffer 221b, an adder 222b, a third receiving mixer 223b, and a third receiving filter 224b.

The first receiving buffer 121b may output the first receiving signal RSig1 to the adder 222b, and the third receiving buffer 221b may output the second receiving signal RSig2 to the adder 222b. The adder 222b may generate a third receiving signal RSig3 by combining the first receiving signal RSig1 with the second receiving signal RSig2. The third receiving mixer 223b may down-convert the third receiving signal RSig3 received from the adder 222b in the frequency domain based on the second receiving frequency signal Rf2, and the third receiving filter 224b may remove unwanted components (for example, the first receiving carrier signal RC1) by filtering the down-converted third receiving signal RSig3 and generate the second receiving carrier signal RC2.

Figure 5A:
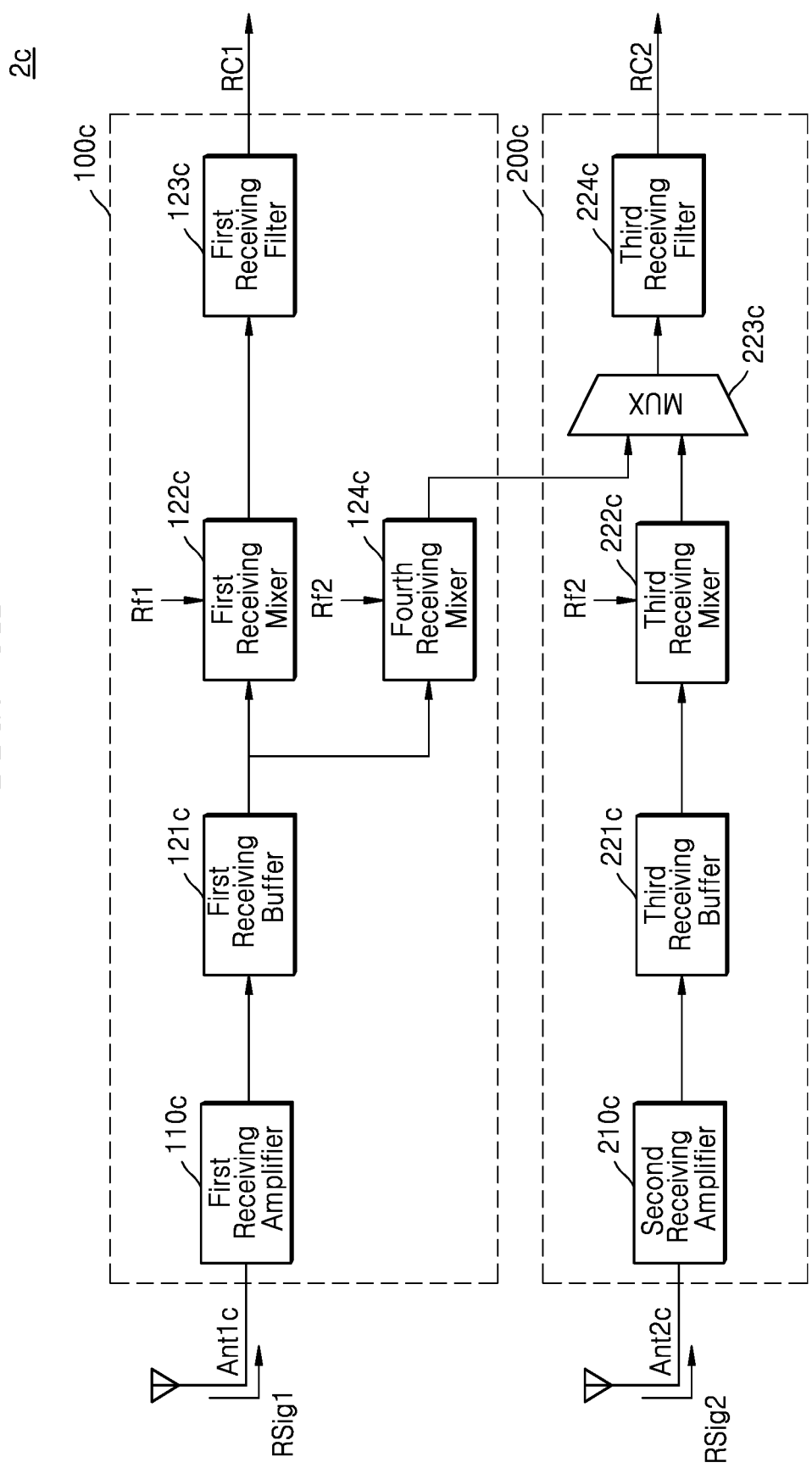
FIG. 5A is a block diagram illustrating a wireless communication device according to an embodiment.

FIG. 5A is a block diagram illustrating a wireless communication device 2c according to an embodiment. Contents overlapping with those given with reference to FIG. 4A are omitted for conciseness.

Referring to FIG. 5A, the wireless communication device 2c may include a first receiver 100c and a second receiver 200c. The first receiver 100c may include a first receiving amplifier 110c, a first receiving buffer 121c, a first receiving mixer 122c, a first receiving filter 123c, and a fourth receiving mixer 124c. The second receiver 200c may include a second receiving amplifier 210c, a third receiving buffer 221c, a third receiving mixer 222c, an MUX 223c, and a third receiving filter 224c.

The first receiving buffer 121c may output the first receiving signal RSig1 to the first receiving mixer 122c and the fourth receiving mixer 124c. The first receiving mixer 122c and the first receiving filter 123c may extract the first receiving carrier signal RC1 from the first receiving signal RSig1, in a similar manner as described above with reference to FIG. 4A.

The fourth receiving mixer 124c may down-convert the first receiving signal RSig1 received from the first receiving buffer 121c in the frequency domain based on the second receiving frequency signal Rf2, and output the down-converted first receiving signal RSig1 to the MUX 223c. A third receiving mixer 222c may down-convert the second receiving signal RSig2 received from the third receiving buffer 221c in the frequency domain based on the second receiving frequency signal Rf2, and output the down-converted second receiving signal RSig1 to the MUX 223c.

In one embodiment, a signal path between the fourth receiving mixer 124c and the first receiving buffer 121c may be shorter than that between the fourth receiving mixer 124c and the MUX 223c. In other words, the fourth receiving mixer 124c may be closer to the first receiving buffer 121c than to the MUX 223c. Since the first receiving signal RSig1 is down-converted and amplified by the fourth receiving mixer 124c and then output to the second receiver 200c, loss of information about the first receiving signal RSig1 may be prevented even at a longer distance between the fourth receiving mixer 124c and the MUX 223c.

The MUX 223c may selectively output to the third receiving filter 224c any one of the first receiving signal RSig1 received from the fourth receiving mixer 124c and the second receiving signal RSig2 received from the third receiving mixer 222c. The third receiving filter 224c may remove unwanted components (for example, the first receiving carrier signal RC1) by filtering the first receiving signal RSig1 or the second receiving signal RSig2, and generate the second receiving carrier signal RC2.

Figure 5B:
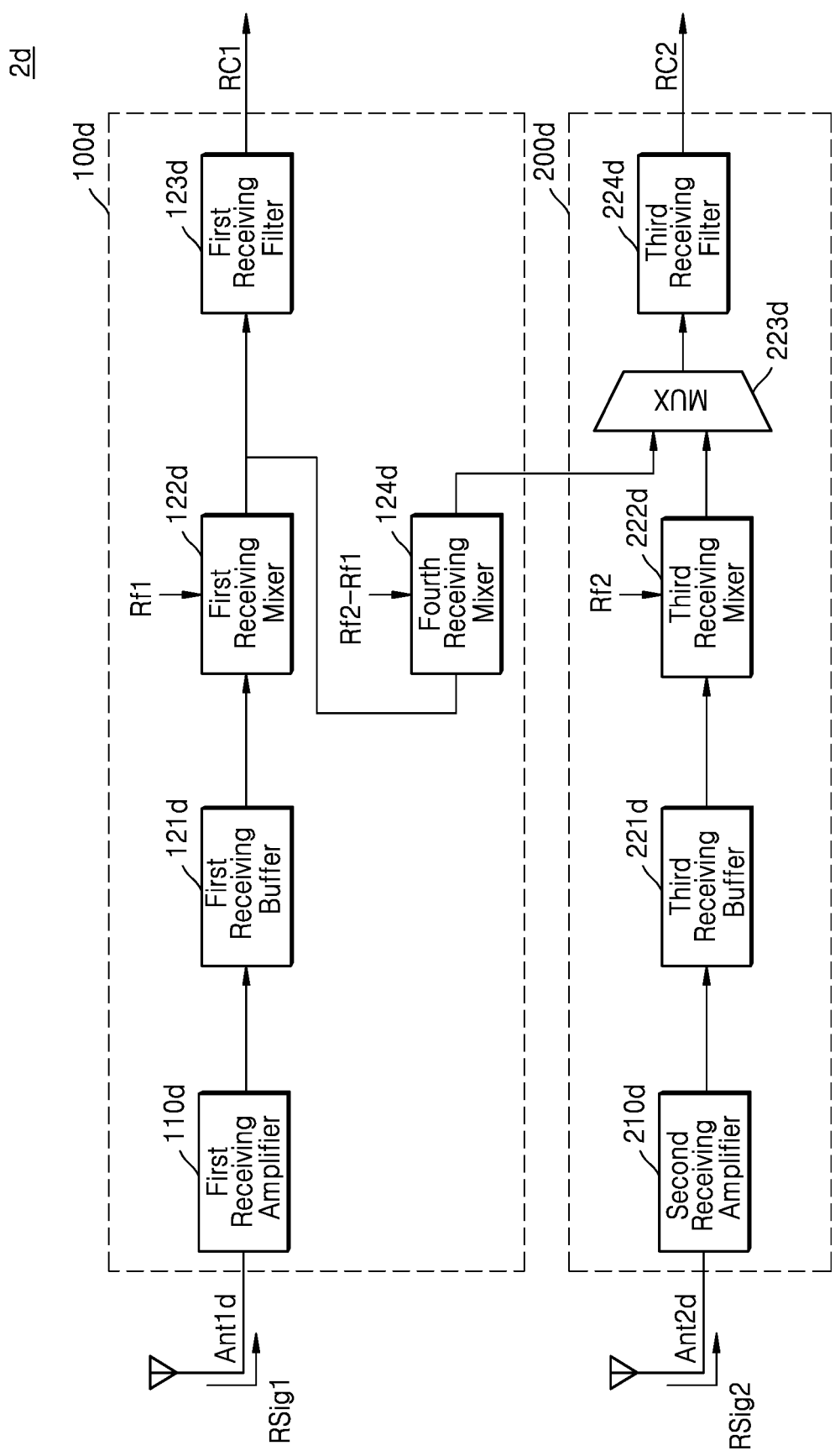
FIG. 5B is a block diagram illustrating a wireless communication device according to an embodiment.

FIG. 5B is a block diagram illustrating a wireless communication device 2d according to an embodiment. Contents overlapping with those given with reference to FIG. 5A is omitted for conciseness.

Referring to FIG. 5B, the wireless communication device 2d may include a first receiver 100d and a second receiver 200d. The first receiver 100d may include a first receiving amplifier 110d, a first receiving buffer 121d, a first receiving mixer 122d, a first receiving filter 123d, and a fourth receiving mixer 124d. The second receiver 200d may include a second receiving amplifier 210d, a third receiving buffer 221d, a third receiving mixer 222d, a MUX 223d, and a third receiving filter 224d.

The fourth receiving mixer 124d may receive the first receiving signal RSig1 from the first receiving mixer 122d. The first receiving signal RSig1 may be down-converted based on the first receiving frequency signal Rf1 by the first receiving mixer 122d. The fourth receiving mixer 124d may down-convert the first receiving signal RSig1 received from the first receiving mixer 122d based on the second receiving frequency signal Rf2 and the first receiving frequency signal Rf1 (for example, the fourth receiving mixer 124d may down-convert the first receiving signal RSig1 based on difference (Rf2-Rf1) between the second receiving frequency signal Rf2 and the first receiving frequency signal Rf1), and as a result, may output to the MUX 223d the down-converted first receiving signal RSig1 based on the second receiving frequency signal Rf2.

The third receiving mixer 222d may down-convert the second receiving signal RSig2 received from the third receiving buffer 221d in the frequency domain based on the second receiving frequency signal Rf2 and output the down-converted second receiving signal RSig2 to the MUX 223d.

The MUX 223d may selectively output to the third receiving filter 224d any one of the first receiving signal RSig1 received from the fourth receiving mixer 124d and the second receiving signal RSig2 received from the third receiving mixer 222d. The third receiving filter 224d may remove unwanted components (for example, the first receiving carrier signal RC1) by filtering the first receiving signal RSig1 or the second receiving signal RSig2, and generate the second receiving carrier signal RC2.

Figure 5C:
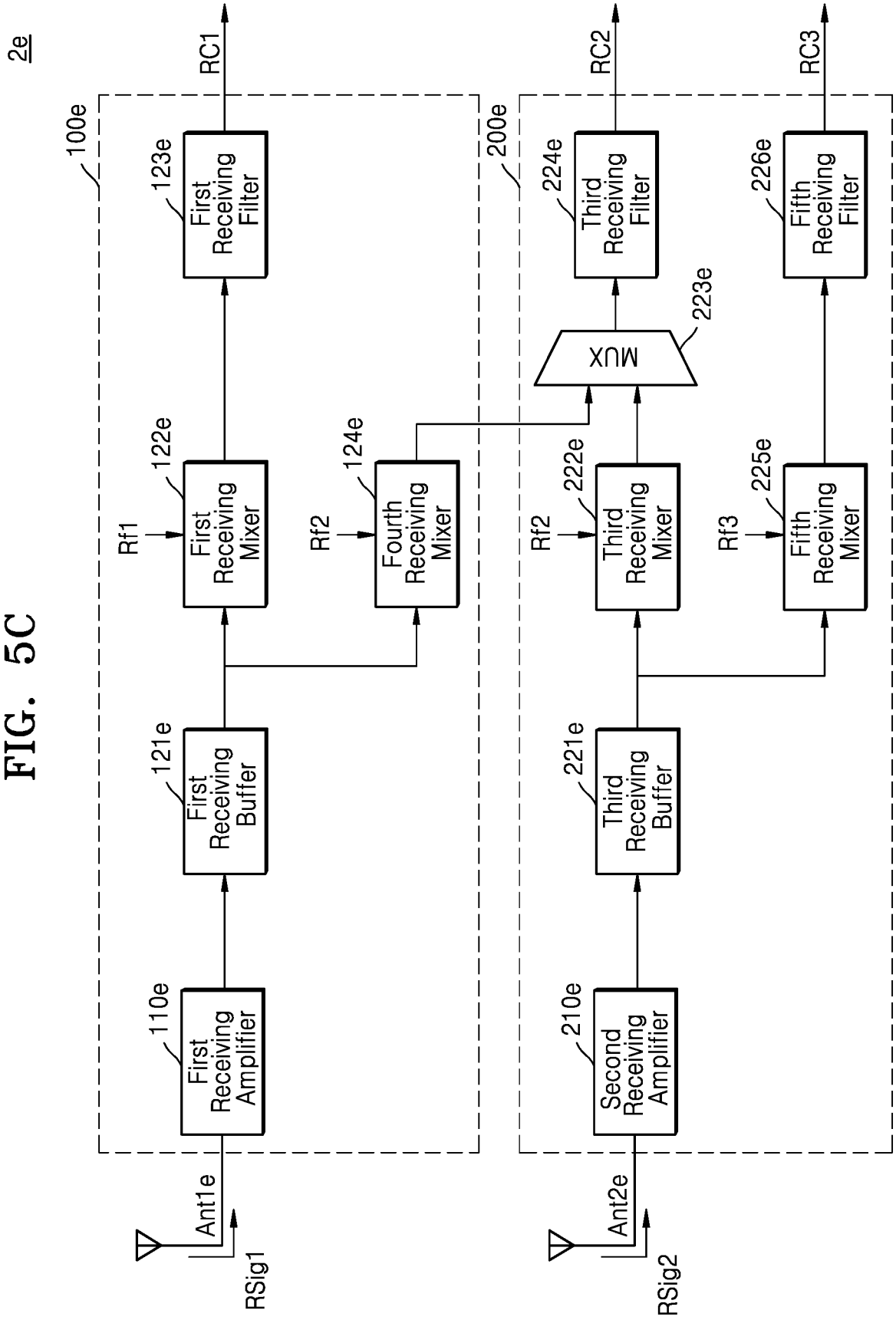
FIG. 5C is a block diagram illustrating a wireless communication device according to an embodiment.

FIG. 5C is a block diagram illustrating a wireless communication device 2e according to an embodiment. Contents overlapping with those given with reference to FIG. 5A are omitted.

Referring to FIG. 5C, the wireless communication device 2e may include a first receiver 100e and a second receiver 200e. The first receiver 100e may include a first receiving amplifier 110e, a first receiving buffer 121e, a first receiving mixer 122e, a first receiving filter 123e, and a fourth receiving mixer 124e. The second receiver 200e may include a second receiving amplifier 210e, a third receiving buffer 221e, a third receiving mixer 222e, a MUX 223e, a third receiving filter 224e, a fifth receiving mixer 225e, and a fifth receiving filter 226e.

The fifth receiving mixer 225e may down-convert the second receiving signal RSig2 received from the third receiving buffer 221e in the frequency domain based on a third receiving frequency signal Rf3, and output the down-converted second receiving signal RSig2 to the fifth receiving filter 226e. In some embodiments, the third receiving frequency signal Rf3 may be the same as the first receiving frequency signal Rf1 or the second receiving frequency signal Rf2. In other embodiments, the third receiving frequency signal Rf3 may be different from the first receiving frequency signal Rf1 and from the second receiving frequency signal Rf2. The fifth receiving filter 226e may output the third receiving carrier signal RC3 by filtering the second receiving signal RSig2.

Figure 5D:
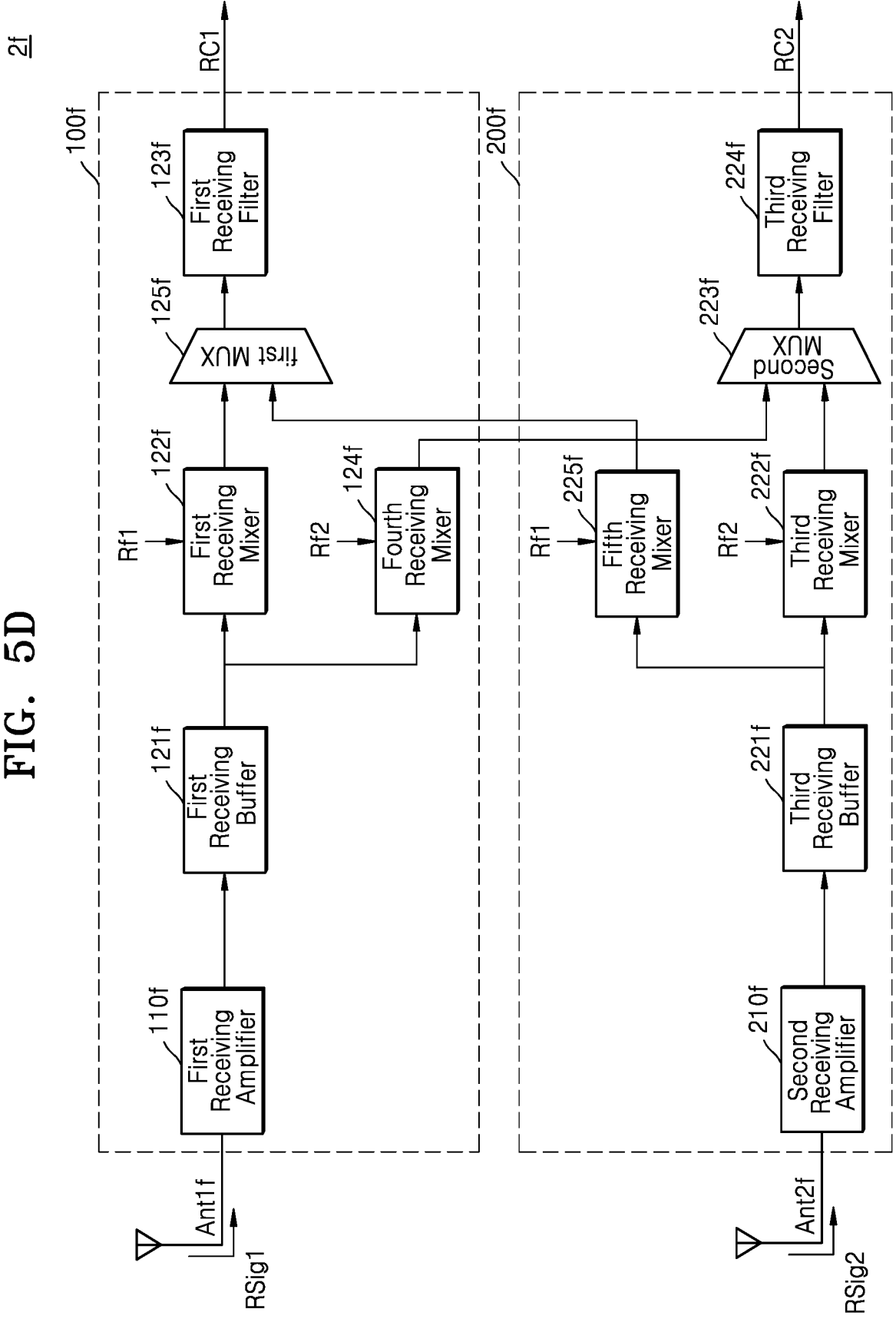
FIG. 5D is a block diagram illustrating a wireless communication device according to an embodiment.

FIG. 5D is a block diagram illustrating a wireless communication device 2f according to an embodiment. Contents overlapping with those given with reference to FIG. 5A are omitted.

Referring to FIG. 5D, the wireless communication device 2f may include a first receiver 100f and a second receiver 200f. The first receiver 100f may include a first receiving amplifier 110f, a first receiving buffer 121f, a first receiving mixer 122f, a first receiving filter 123f, a fourth receiving mixer 124f, and a first MUX 125f. The second receiver 200f may include a second receiving amplifier 210f, a third receiving buffer 221f, a third receiving mixer 222f, a second MUX 223f, a third receiving filter 224f, and a fifth receiving mixer 225f.

The fifth receiving mixer 225f may down-convert the second receiving signal RSig2 received from the first receiving buffer 121f in the frequency domain based on the first receiving frequency signal Rf1, and output the down-converted second receiving signal RSig2 to the first MUX 125f. The first MUX 125f may selectively output to the first receiving filter 123f the first receiving signal RSig1 received from the first receiving mixer 122f or the second receiving signal Rsig2 received from the fifth receiving mixer 225f, and the first receiving filter 123f may output the third receiving carrier signal RC1 by filtering the received first receiving signal RSig1 or the received second receiving signal RSig2.

The wireless communication device 2f according to an embodiment may determine the signal transmission routes differently according to a receiving ratio of a carrier. In this specification, the receiving ratio may be referred to a ratio of a level of the first receiving signal RSig1 to a level of second receiving signal RSig2. In one example, when the receiving ratio (RSig1 to RSig2) is such that of a level of the first receiving signal RSig1 is low and a level of the second receiving signal RSig2 is high, the wireless communication device 2f may control the first MUX 125f to obtain the first receiving signal RC1 from the second receiving signal RSig2. In one example, on the other hand, when the receiving ratio (RSig1 to RSig2) is such that the level of the first receiving signal RSig1 is high and the level of the second receiving signal RSig2 is low, the wireless communication device 2f may control the second MUX 223f to obtain the second receiving signal RC2 from the first receiving signal RSig1.

FIG. 5D illustrates an embodiment in which the wireless communication device 2f includes the first MUX 125f and the second MUX 223f, but the inventive concept is not limited thereto, and may be also applicable to an embodiment in which the wireless communication device 2f includes at least one adder instead of the first MUX 125f and the second MUX 223f.

Figure 5E:
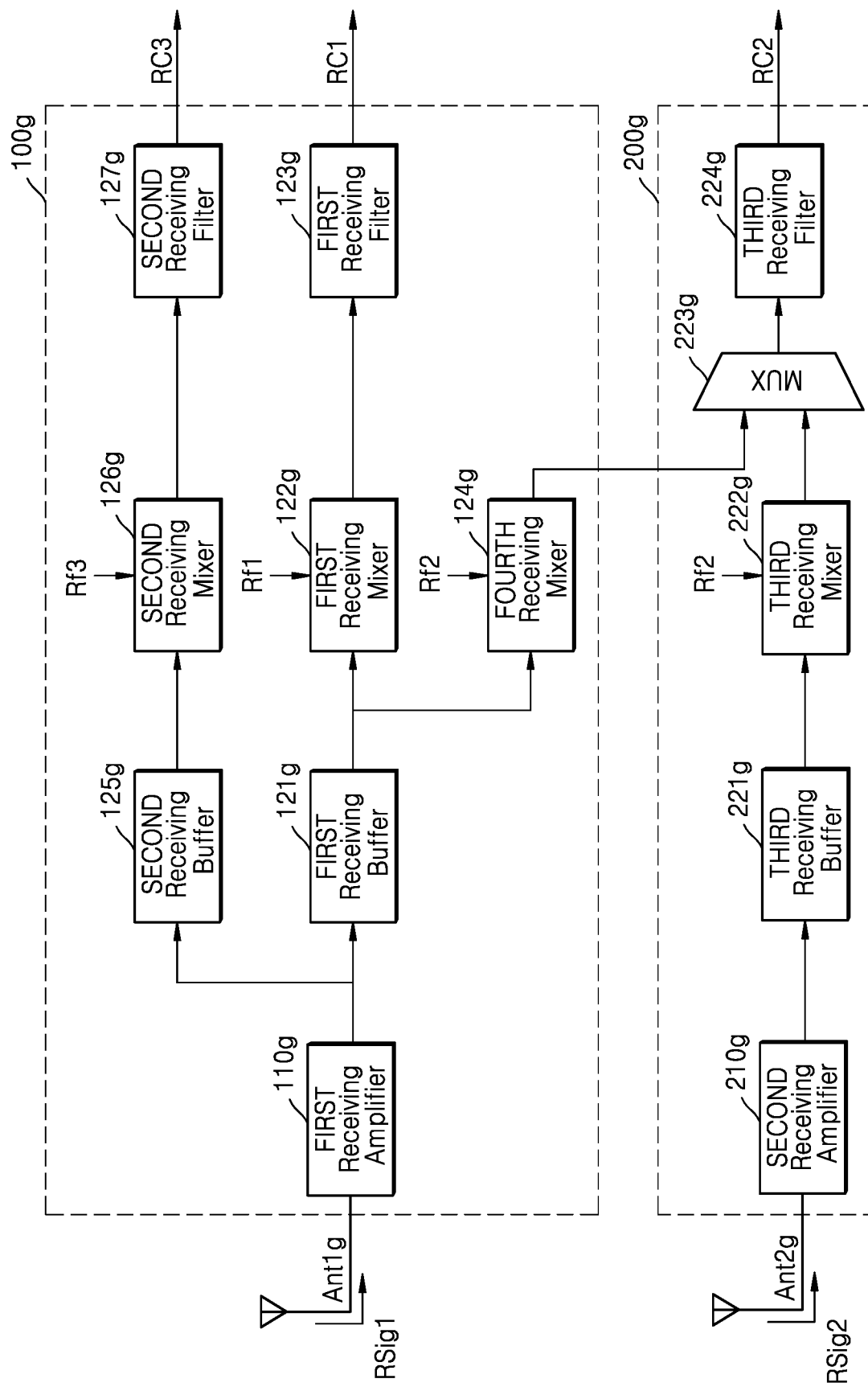
FIG. 5E is a block diagram illustrating a wireless communication device according to an embodiment.

FIG. 5E is a block diagram illustrating a wireless communication device 2g according to an embodiment. Contents overlapping with those given with reference to FIG. 5A are omitted for conciseness.

Referring to FIG. 5E, the wireless communication device 2g may include a first receiver 100g and a second receiver 200g. The first receiver 100g may include a first receiving amplifier 110g, a first receiving buffer 121g, a first receiving mixer 122g, a first receiving filter 123g, a fourth receiving mixer 124g, and a second receiving buffer 125g, a second receiving mixer 126g, and a second receiving filter 127g. The second receiver 200g may include a second receiving amplifier 210g, a third receiving buffer 221g, a third receiving mixer 222g, a MUX 223g, and a third receiving filter 224g.

The second receiving buffer 125g may receive the first receiving signal RSig1 from the first receiving amplifier 110g and output the first receiving signal RSig1 to the second receiving mixer 126g. The second receiving mixer 126g may down-convert the first receiving signal RSig1 in the frequency domain based on the third receiving frequency signal Rf3 and output the down-converted first receiving signal RSig1 to the second receiving filter 127g. In some embodiments, the third receiving frequency signal Rf3 may be the same as the first receiving frequency signal Rf1 or the second receiving frequency signal Rf2. In other embodiments, the third receiving frequency signal Rf3 may be different from the first receiving frequency signal Rf1 and the second receiving frequency signal Rf2. The second receiving filter 127g may output the third receiving carrier signal RC3 by filtering the received first receiving signal RSig1.

Figure 5F:
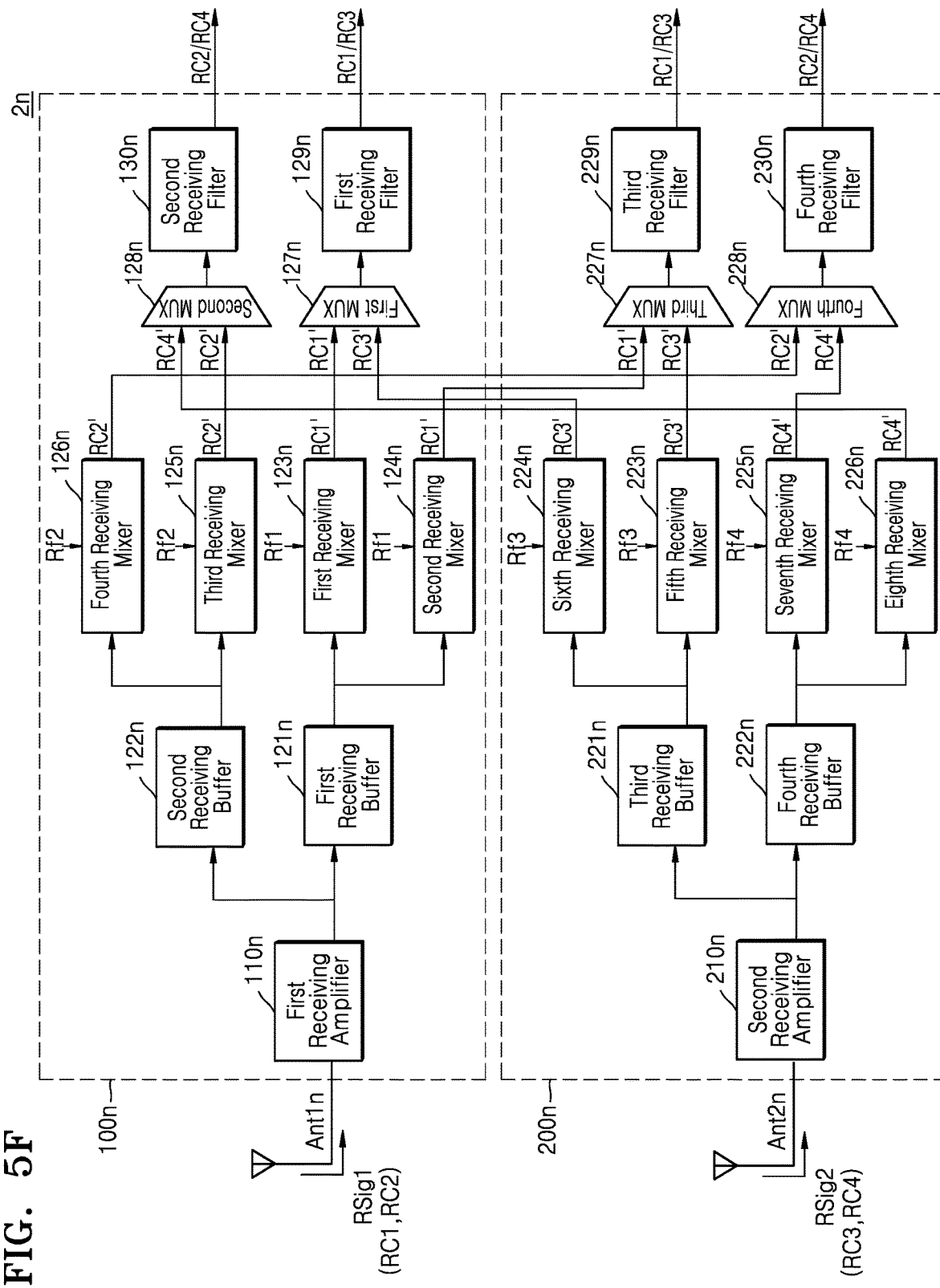
FIG. 5F is a block diagram illustrating a wireless communication device according to an embodiment.

FIG. 5F is a block diagram illustrating a wireless communication device 2n according to an embodiment. Contents overlapping with those given with reference to FIG. 5A are omitted for conciseness.

Referring to FIG. 5F, the wireless communication device 2n may include a first receiver 100n and a second receiver 200n. The first receiver 100n may include a first receiving amplifier 110n, a first receiving buffer 121n, a second receiving buffer 122n, a first receiving mixer 123n, a second receiving mixer 124n, a third receiving mixer 125n, a fourth receiving mixer 126n, a first MUX 127n, a second MUX 128n, a first receiving filter 129n, and a second receiving filter 130n. The second receiver 200n may include a second receiving amplifier 210n, a third receiving buffer 221n, a fourth receiving buffer 222n, a fifth receiving mixer 223n, a sixth receiving mixer 224n, a seventh receiving mixer 225n, an eighth receiving mixer 226n, a third MUX 227n, a fourth MUX 228n, a third receiving filter 229n, and a fourth receiving filter 230n.

The first receiving amplifier 110n may amplify the first receiving signal RSig1 including the first receiving carrier signal RC1 and the second receiving carrier signal RC2, and output the amplified first receiving signal RSig1 to the first receiving buffer 121n and the second receiving buffer 122n. The first receiving mixer 123n may down-convert the first receiving signal RSig1 received from the first receiving buffer 121n based on the first receiving frequency signal Rf1 and output a first free receiving carrier signal RC1' generated thereby to the first MUX 127n. The second receiving mixer 124n may down-convert the first receiving signal RSig1 received from the first receiving buffer 121n based on the first receiving frequency signal Rf1 and output the generated first free receiving carrier signal RC1' to the third MUX 227n. The third receiving mixer 125n may down-convert the first receiving signal RSig1 received from the second receiving buffer 122n based on the second receiving frequency signal Rf2 and output a second free receiving carrier signal RC2' generated thereby to the second MUX 128n. The fourth receiving mixer 126n may down-convert the first receiving signal RSig1 received from the second receiving buffer 122n based on the second receiving frequency signal Rf2 and output the generated second free receiving carrier signal RC2' to the fourth MUX 228n.

The second receiving amplifier 210n may amplify the second receiving signal RSig2 including the third receiving carrier signal RC3 and the fourth receiving carrier signal RC4, and output the amplified second receiving signal RSig2 to the third receiving buffer 221n and a fourth receiving buffer 222n. The fifth receiving mixer 223n may down-convert the second receiving signal RSig2 received from the third receiving buffer 221n based on the third receiving frequency signal Rf3 and output a third free receiving carrier signal RC3' generated thereby to the third MUX 227n. The sixth receiving mixer 224n may down-convert the second receiving signal RSig2 received from the third receiving buffer 221n based on the third receiving frequency signal Rf3 and output the generated third free receiving carrier signal RC3' to the first MUX 127n. The seventh receiving mixer 225n may down-convert the second receiving signal RSig2 received from the fourth receiving buffer 222n based on a fourth receiving frequency signal Rf4 and output a fourth free receiving carrier signal RC4' generated thereby to the fourth MUX 228n. The eighth receiving mixer 226n may down-convert the second receiving signal RSig2 received from the fourth receiving buffer 222n based on the fourth receiving frequency signal Rf4 and output the generated fourth free receiving carrier signal RC4' to the second MUX 128n.

The first MUX 127n may selectively output to the first receiving filter 129n any one of the first free receiving carrier signal RC1' and the third free receiving carrier signal RC3'. The first receiving filter 129n may output the first receiving carrier signal RC1 or the third receiving carrier signal RC3 by filtering the first free receiving carrier signal RC1' or the third free receiving carrier signal RC3', respectively. The second MUX 128n may selectively output to the second receiving filter 130n any one of the second free receiving carrier signal RC2' and the fourth free receiving carrier signal RC4'. The second receiving filter 130n may output the second receiving carrier signal RC2 or the fourth receiving carrier signal RC4 by filtering the second free receiving carrier signal RC2' or the fourth free receiving carrier signal RC4', respectively.

The third MUX 227n may selectively output to the third receiving filter 229n any one of the first free receiving carrier signal RC1' and the third free receiving carrier signal RC3'.

The third receiving filter 229n may output the first receiving carrier signal RC1 or the third receiving carrier signal RC3 by filtering the first free receiving carrier signal RC1' or the third free receiving carrier signal RC3', respectively. The fourth MUX 228n may selectively output to the fourth receiving filter 230n any one of the second free receiving carrier signal RC2' and the fourth free receiving carrier signal RC4'. The fourth receiving filter 230n may output the second receiving carrier signal RC2 or the fourth receiving carrier signal RC4 by filtering the second free receiving carrier signal RC2' or the fourth free receiving carrier signal RC4', respectively.

In FIG. 5F, the first receiving mixer 123n and the second receiving mixer 124n, the third receiving mixer 125n, and the fourth receiving mixer 126n are illustrated as being separate from each other. However, the first receiving mixer 123n and the second receiving mixer 124n may be implemented in one component, and the third receiving mixer 125n and the fourth receiving mixer 126n may be implemented in one component. In addition, in FIG. 5F, the fifth receiving mixer 223n, the sixth receiving mixer 224n, the seventh receiving mixer 225n, and the eighth receiving mixer 226n are illustrated as being separate from each other. However, the fifth receiving mixer 223n and the sixth receiving mixer 224n may be implemented in one component, and the seventh receiving mixer 225n and the eighth receiving mixer 226n may be implemented in one component.

Figure 6:
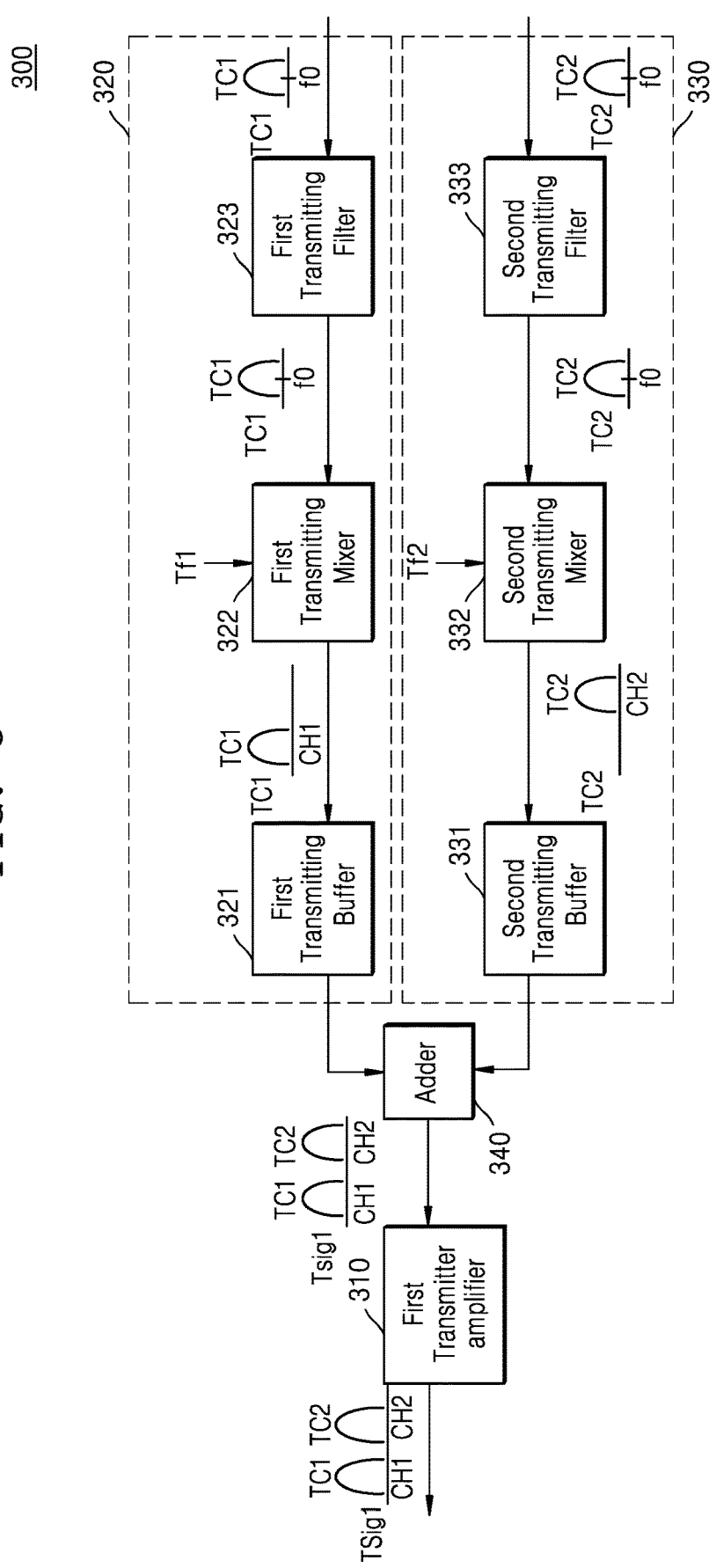
FIG. 6 is a block diagram illustrating a transmitter according to an embodiment.

FIG. 6 is a block diagram illustrating the first transmitter 300 according to an embodiment. Contents overlapping with those given with reference to FIG. 2 is omitted for conciseness.

Referring to FIG. 6, the first transmitter 300 may include the first transmitting amplifier 310, the first carrier transmitter 320, the second carrier transmitter 330, and an adder 340. The first carrier transmitter 320 may include a first transmitting buffer 321, a first transmitting mixer 322, and a first transmitting filter 323. The second carrier transmitter 330 may include a second transmitting buffer 331, a second transmitting mixer 332, and a second transmitting filter 333.

The first transmitting filter 323 may receive the first transmitting carrier signal TC1. The first transmitting filter 323 may remove unwanted components (for example, noise) by filtering the first transmitting carrier signal TC1. In one example, the first transmitting filter 323 may be an LPF. The first transmitting mixer 322 may move the first transmitting carrier signal Tsig1 in the frequency domain by using a first transmitting frequency signal Tf1 received from a control circuit (not shown) so that the first transmitting carrier signal TC1 is located in a first channel CH1. In one embodiment, the first transmitting mixer 322 may up-convert the first transmitting signal TC1 in the frequency domain based on the first transmitting frequency signal Tf1, and to this end, may include an amplifier and a multiplier. The first transmitting buffer 321 may receive and buffer the up-converted first transmitting carrier signal TC1 and output the buffered first transmitting carrier signal TC1 to the adder 340.

The second transmitting filter 333 may receive the second transmitting carrier signal TC2. The second transmitting filter 333 may remove unwanted components (for example, noise) by filtering the second transmitting carrier signal TC2. In one example, the second transmitting filter 333 may be an LPF. The second transmitting mixer 332 may move the second transmitting carrier signal TC2 in the frequency domain by using the second transmitting frequency signal Tf2 received from a control circuit (not shown) so that the second transmitting carrier signal TC2 is located in a second channel CH2. In one embodiment, the second transmitting mixer 332 may up-convert the second transmitting carrier signal TC2 in the frequency domain based on the second transmitting frequency signal Tf2, and to this end, may include an amplifier and a multiplier. The second transmitting buffer 331 may receive and buffer the up-converted second transmitting carrier signal TC2 and output the buffered second transmitting carrier signal TC2 to the adder 340.

The adder 340 may generate the first transmitting signal TSig1 by combining the first transmitting carrier signal TC1 with the second transmitting carrier signal TC2 that exist in different channels, that is, the first and second channels CH1 and CH2. The adder 340 may output the generated first transmitting signal TSig1 to the first transmitting amplifier 310, and the first transmitting amplifier 310 may amplify the generated first transmitting signal TSig1 received from the adder 340. In one example, the first transmitting amplifier 310 may be a power amplifier (PA). The amplified first transmitting signal TSig1 may be output to the outside (for example, the second wireless communication device 3 in FIG. 1) via the first antenna (Ant1_1 in FIG. 1). Although not illustrated, the first transmitter 300 may further include a transmitting amplifier driver to drive the first transmitting amplifier 310.

Figure 7A:
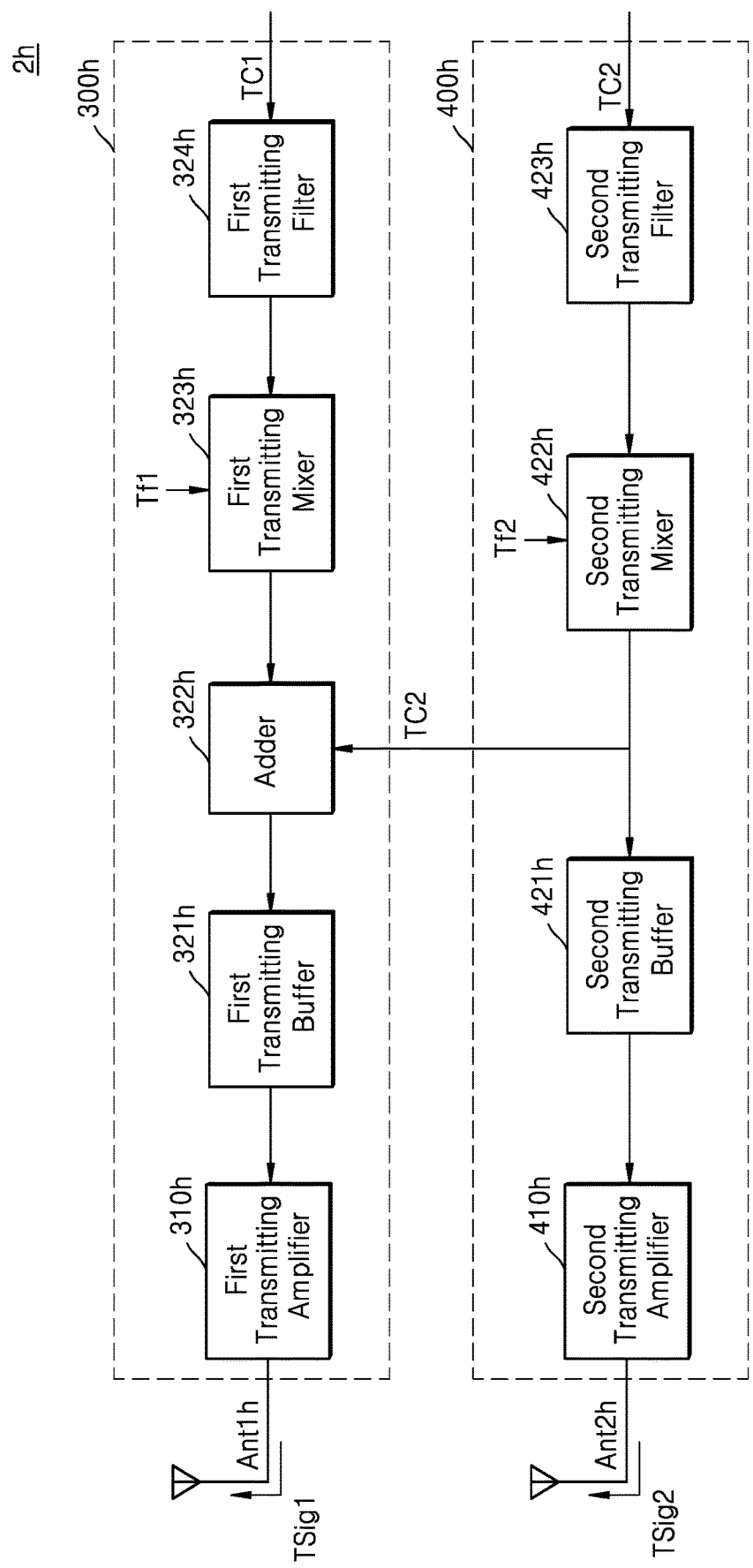
FIG. 7A is a block diagram illustrating a wireless communication device according to an embodiment.

FIG. 7A is a block diagram illustrating a wireless communication device 2h according to an embodiment. Contents overlapping with those given with reference to FIG. 6 are omitted for conciseness.

Referring to FIG. 7A, the wireless communication device 2h may include a first transmitter 300h and a second transmitter 400h. The first transmitter 300h may include a first transmitting amplifier 310h, a first transmitting buffer 321h, an adder 322h, a first transmitting mixer 323h, and a first transmitting filter 324h. The second transmitter 400h may include a second transmitting amplifier 410h, a second transmitting buffer 421h, a second transmitting mixer 422h, and a second transmitting filter 423h.

The second transmitting filter 423h may receive the second transmitting carrier signal TC2. The second transmitting filter 423h may remove unwanted components by filtering the second transmitting carrier signal TC2 and output a result to the second transmitting mixer 422h. The second transmitting mixer 422h may up-convert the second transmitting carrier signal TC2 in the frequency domain based on the second transmitting frequency signal Tf2 and output the up-converted second transmitting carrier signal TC2 to the second transmitting buffer 421h and the adder 322h. The second transmitting buffer 421h may buffer the up-converted second transmitting carrier signal TC2 and then output the buffered second transmitting carrier signal TC2 to the second transmitting amplifier 410h. The second transmitting amplifier 410h may output the second transmitting signal TSig2 generated by amplifying the buffered second receiving carrier signal TC2 to the outside (for example, the second wireless communication device 3 in FIG. 1) via a second antenna Ant2h.

The first transmitting filter 324h may receive the first transmitting carrier signal TC1. The first transmitting filter 324h may remove unwanted components (for example, noise) by filtering the first transmitting carrier signal TC1 and output the filtered first transmitting carrier signal TC1 to the first transmitting mixer 323h. The first transmitting mixer 323h may up-convert the first transmitting carrier signal TC1 in the frequency domain based on the first transmitting frequency signal Tf1 and output the up-converted first transmitting carrier signal TC1 to the adder 322h.

The adder 322h may generate the first transmitting signal TSig1 by combining the first transmitting carrier signal TC1 received from the first transmitting mixer 323h with the second transmitting carrier signal TC2 received from the second transmitting mixer 422h. Accordingly, the first transmitting signal TSig1 may have not only information about the first transmitting carrier signal TC1 of the first channel CH1 but also information about the second transmitting carrier signal TC2 of the second channel CH2. The adder 322h may output the first transmitting signal TSig1 to the first transmitting buffer 321h, and the first transmitting buffer 321h may buffer the first transmitting signal TSig1 and then, output the buffered first transmitting signal TSig1 to the first transmitting amplifier 310h. The first transmitting amplifier 310h may amplify the first transmitting signal TSig1 and then, output the amplified first transmitting signal TSig1 to the outside (for example, the second wireless communication device 3 of FIG. 1) via a first antenna Ant1h.

Figure 7B:
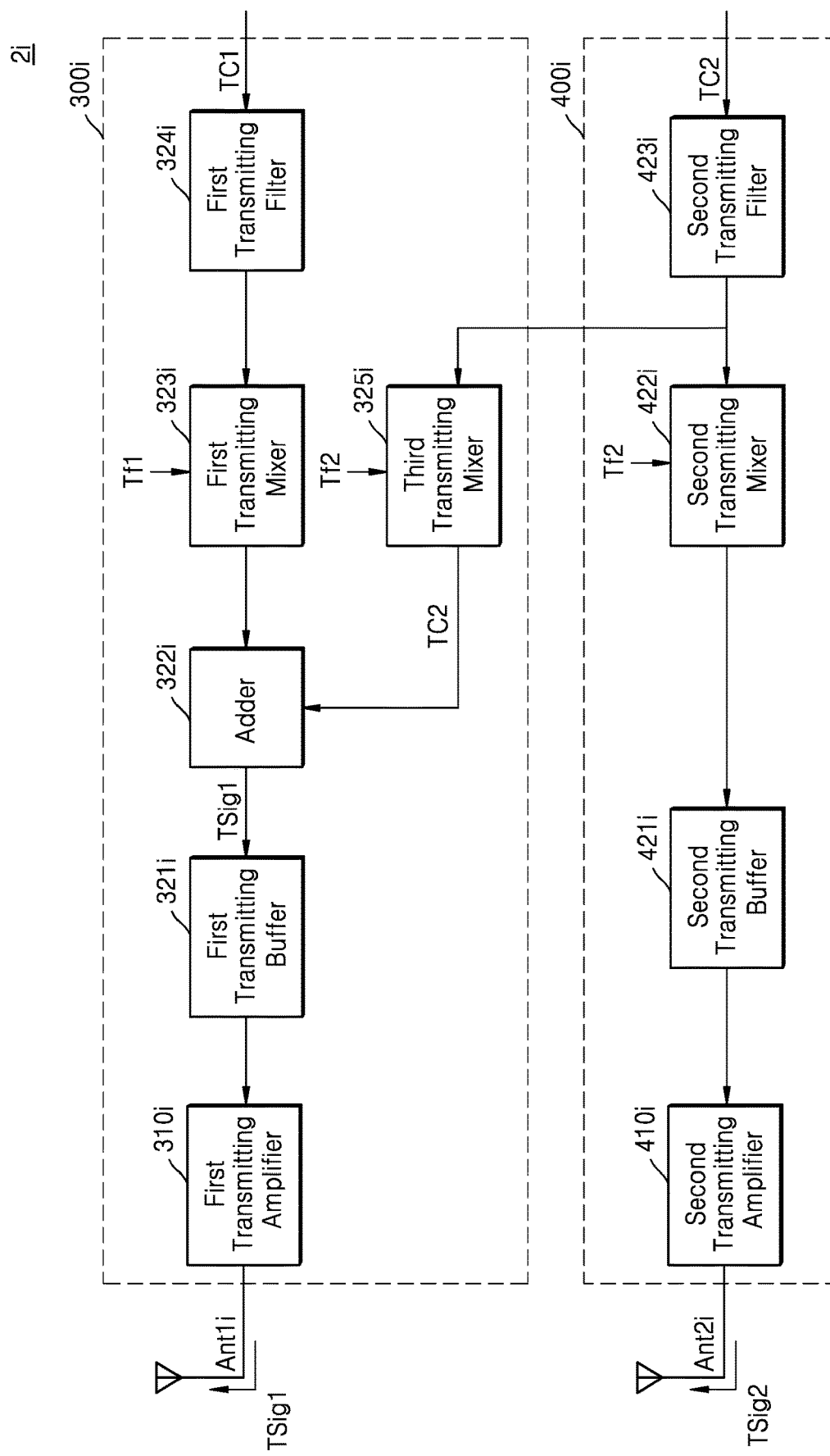
FIG. 7B is a block diagram illustrating a wireless communication device according to an embodiment.

FIG. 7B is a block diagram illustrating a wireless communication device 2i according to an embodiment. Contents overlapping with those given with reference to FIG. 7A are omitted.

Referring to FIG. 7B, the wireless communication device 2i may include a first transmitter 300i and a second transmitter 400i. The first transmitter 300i may include a first transmitting amplifier 310i, a first transmitting buffer 321i, an adder 322i, a first transmitting mixer 323i, a first transmitting filter 324i, and a third transmitting mixer 325i. The second transmitter 400i may include a second transmitting amplifier 410i, a second transmitting buffer 421i, a second transmitting mixer 422i, and a second transmitting filter 423i.

The second transmitting filter 423i may receive and filter the second transmitting carrier signal TC2. The second transmitting filter 423i may output the filtered second transmitting carrier signal TC2 to the second transmitting mixer 422i and the third transmitting mixer 325i.

The second transmitting mixer 422i may up-convert the second transmitting carrier signal TC2 in the frequency domain based on the second transmitting frequency signal Tf2 and output the up-converted second transmitting carrier signal TC2 to the second transmitting buffer 421i. The second transmitting buffer 421i may buffer the second transmitting carrier signal TC2 and then, output the buffered second transmitting carrier signal TC2 to the second transmitting amplifier 410i. The second transmitting amplifier 410i may output the second transmitting signal TSig2 generated by amplifying the amplified second receiving carrier signal TC2 to the outside (for example, the second wireless communication device 3 in FIG. 1) via a second antenna Ant2i.

The third transmitting mixer 325i may up-convert the second transmitting carrier signal TC2 in the frequency domain based on the second transmitting frequency signal Tf2 and output the up-converted second transmitting carrier signal TC2 to the adder 322i. The adder 322i may generate the first transmitting signal TSig1 by combining the first transmitting carrier signal TC1 received from the first transmitting mixer 323i with the second transmitting carrier signal TC2 received from the third transmitting mixer 325i. The adder 322i may output the first transmitting signal TSig1 to the first transmitting buffer 321i, and the first transmitting buffer 321i may buffer the first transmitting signal TSig1 and then, output the buffered first transmitting signal TSig1 to the first transmitting amplifier 310i. The first transmitting amplifier 310i may amplify the first transmitting signal TSig1 and then, output the amplified first transmitting signal TSig1 to the outside (for example, the second wireless communication device 3 of FIG. 1) via a first antenna Ant1i.

In one embodiment, a signal path between the third transmitting mixer 325i and the adder 322i may be shorter than that between the third transmitting mixer 325i and the second transmitting filter 423i. In other words, the third transmitting mixer 325i may have a longer signal path from the second transmitting filter 423i than to the adder 322i. Since in this case the third transmitting mixer 325i is located closer to the adder 322i, up-converts and amplifies the second transmitting carrier signal TC2, and then outputs the amplified second transmitting carrier signal TC2 to the adder 322i, loss of information about the second transmission carrier signal TC2 may be prevented.

Figure 7C:
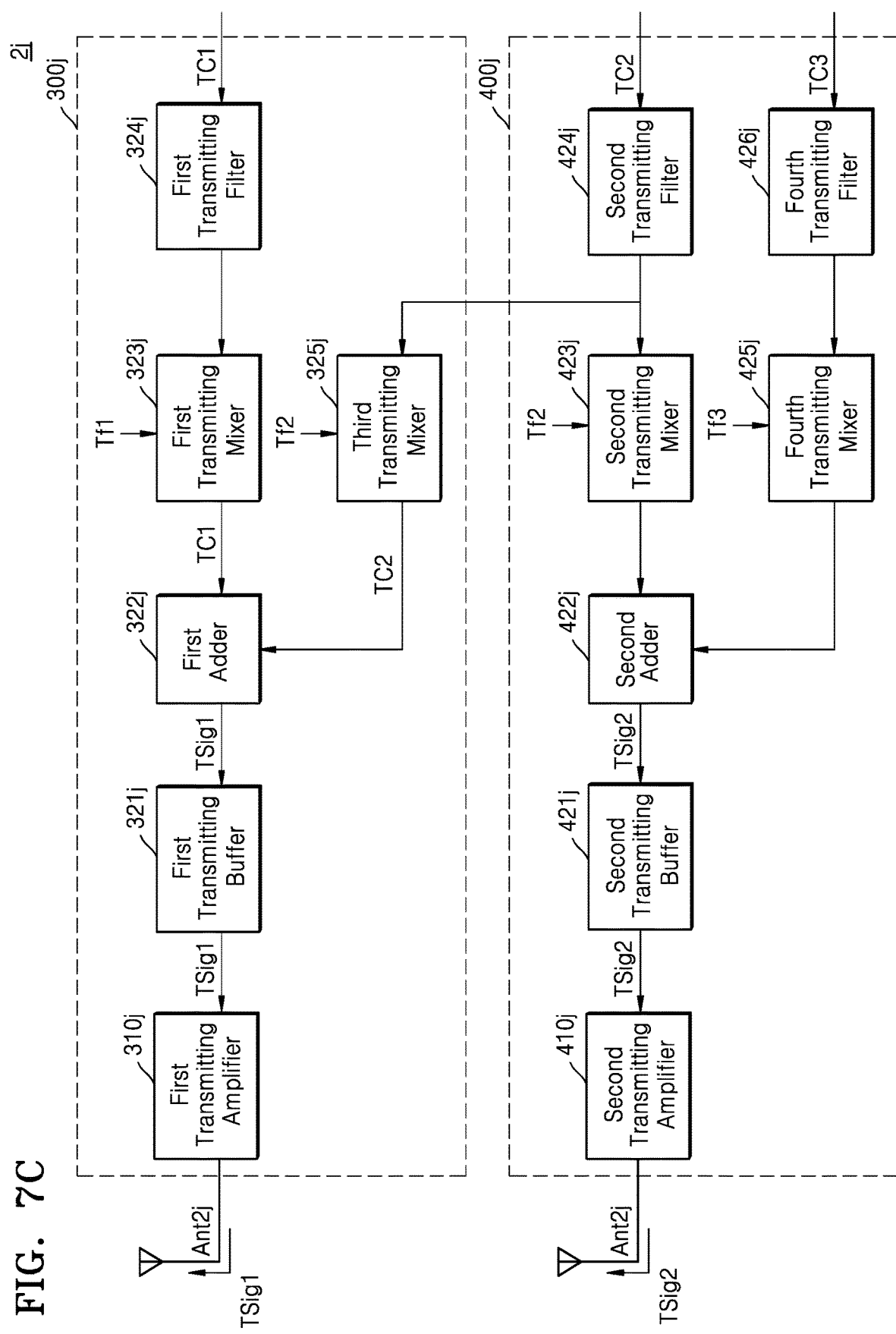
FIG. 7C is a block diagram illustrating a wireless communication device according to an embodiment.

FIG. 7C is a block diagram illustrating a wireless communication device 2j according to an embodiment. Contents overlapping with those given with reference to FIG. 7B are omitted.

Referring to FIG. 7C, the wireless communication device 2j may include a first transmitter 300j and a second transmitter 400j. The first transmitter 300j may include a first transmitting amplifier 310j, a first transmitting buffer 321j, a first adder 322j, a first transmitting mixer 323j, a first transmitting filter 324j, and a third transmitting mixer 325j. The second transmitter 400j may include a second transmitting amplifier 410j, a second transmitting buffer 421j, a second adder 422j, a second transmitting mixer 423j, a second transmitting filter 424j, a fourth transmitting mixer 425j, and a fourth transmitting filter 426j.

The fourth transmitting filter 426j may receive a third transmitting carrier signal TC3 and may filter the received third transmitting carrier signal TC3. The fourth transmitting mixer 425j may up-convert the third transmitting carrier signal TC3 received from the fourth transmitting filter 426j in the frequency domain based on a third transmitting frequency signal Tf3, and output the up-converted third transmitting carrier signal TC3 to the second adder 422j. In some embodiments, the third transmitting frequency signal Tf3 may be the same as the first transmitting frequency signal Tf1 or the second transmitting frequency signal Tf2. In other embodiments, the third transmitting frequency signal Tf3 may be different from the first transmitting frequency signal Tf1 and the second transmitting frequency signal Tf2. The second adder 422j may generate the second transmitting signal TSig2 by combining the second transmitting carrier signal TC2 received from the second transmitting mixer 423j with the third transmitting carrier signal TC3 received from the fourth transmitting mixer 425j.

Figure 7D:
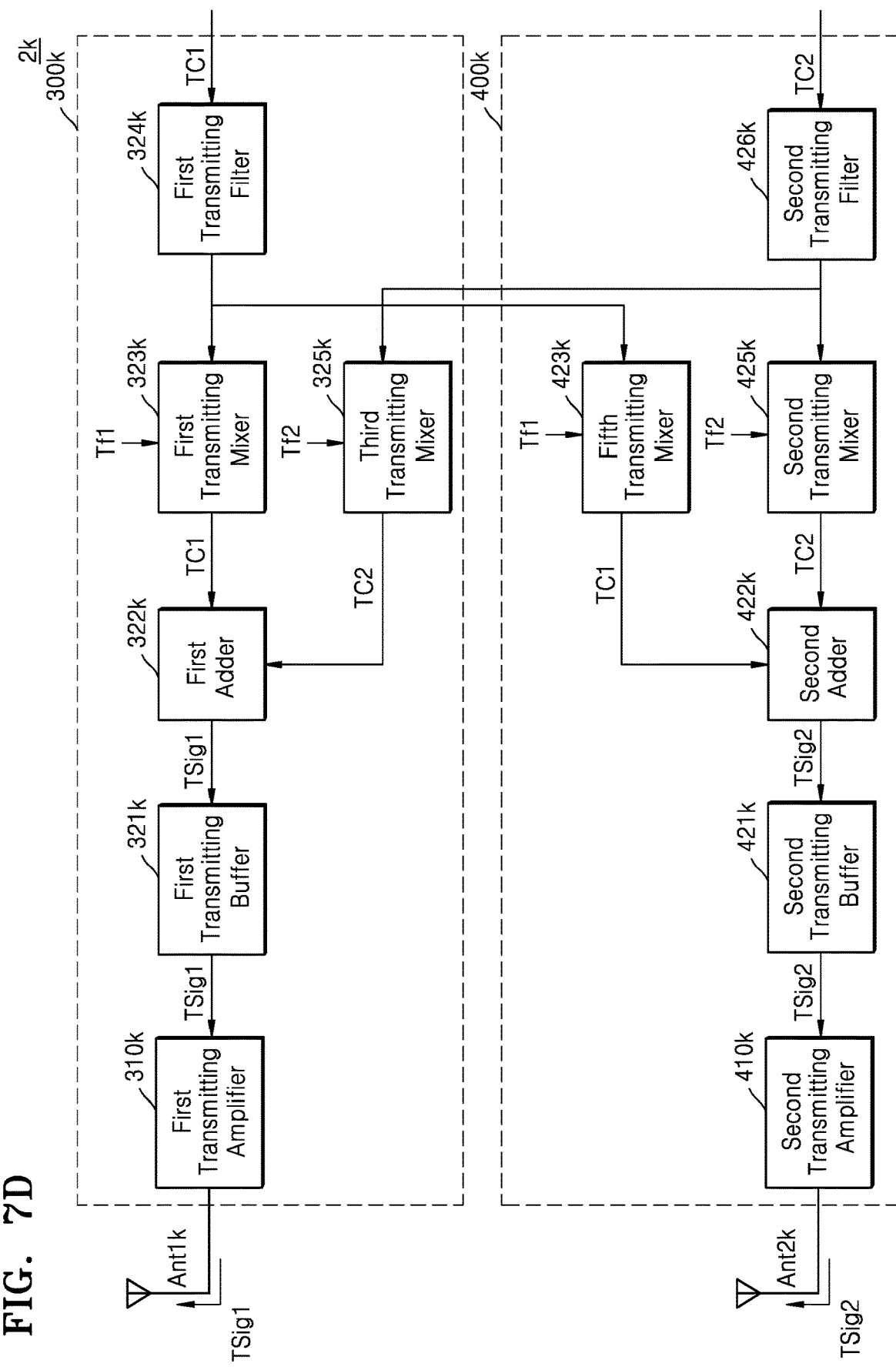
FIG. 7D is a block diagram illustrating a wireless communication device according to an embodiment.

FIG. 7D is a block diagram illustrating a wireless communication device 2k according to an embodiment. Contents overlapping with those given with reference to FIG. 7B are omitted.

Referring to FIG. 7D, the wireless communication device 2k may include a first transmitter 300k and a second transmitter 400k. The first transmitter 300k may include a first transmitting amplifier 310k, a first transmitting buffer 321k, a first adder 322k, a first transmitting mixer 323k, a first transmitting filter 324k, and a third transmitting mixer 325k. The second transmitter 400k may include a second transmitting amplifier 410k, a second transmitting buffer 421k, a second adder 422k, a second transmitting mixer 425k, a second transmitting filter 426k, and a fifth transmitting mixer 423k.

The first transmitting filter 324k may receive the first transmitting carrier signal TC1 and may filter the received first transmitting carrier signal TC1. The first transmitting filter 324k may output the filtered first transmitting carrier signal TC1 to the first transmitting mixer 323k as well as the fifth transmitting mixer 423k. The fifth transmitting mixer 423k may up-convert the first transmitting carrier signal TC1 received from the first transmitting filter 324k in the frequency domain based on a first transmitting frequency signal Tf1, and output the up-converted first transmitting carrier signal TC1 to the second adder 422k. The second adder 422k may generate the second transmitting signal TSig2 by combining the second transmitting carrier signal TC2 received from the second transmitting mixer 425k with the up-converted first transmitting carrier signal TC1 received from the fifth transmitting mixer 423k.

The wireless communication device 2k according to the embodiment may determine the signal transmitting routes differently according to transmission capabilities of a first antenna Ant1k and a second antenna Ant2k. In one example, when the transmission capability of the first antenna Ant1k is good and the transmission capability of the second antenna Ant2k is poor, the wireless communication device 2k may transmit the second transmitting carrier signal TC2 to the first antenna Ant1k via the third transmitting mixer 325k, and the first antenna Ant1k may output to the outside the first transmitting signal TSig1 in which the second transmitting carrier signal TC2 and the first transmitting carrier signal TC1 are combined. In another example, when the transmission capability of the first antenna Ant1k is poor and the transmission capability of the second antenna Ant2k is good, the wireless communication device 2k may transmit the first transmitting carrier signal TC1 to the second antenna Ant2k via the fifth transmitting mixer 423k, and the second antenna Ant2k may output to the outside the second transmitting signal TSig2 in which the first transmitting carrier signal TC1 and the second transmitting carrier signal TC2 are combined.

Figure 7E:
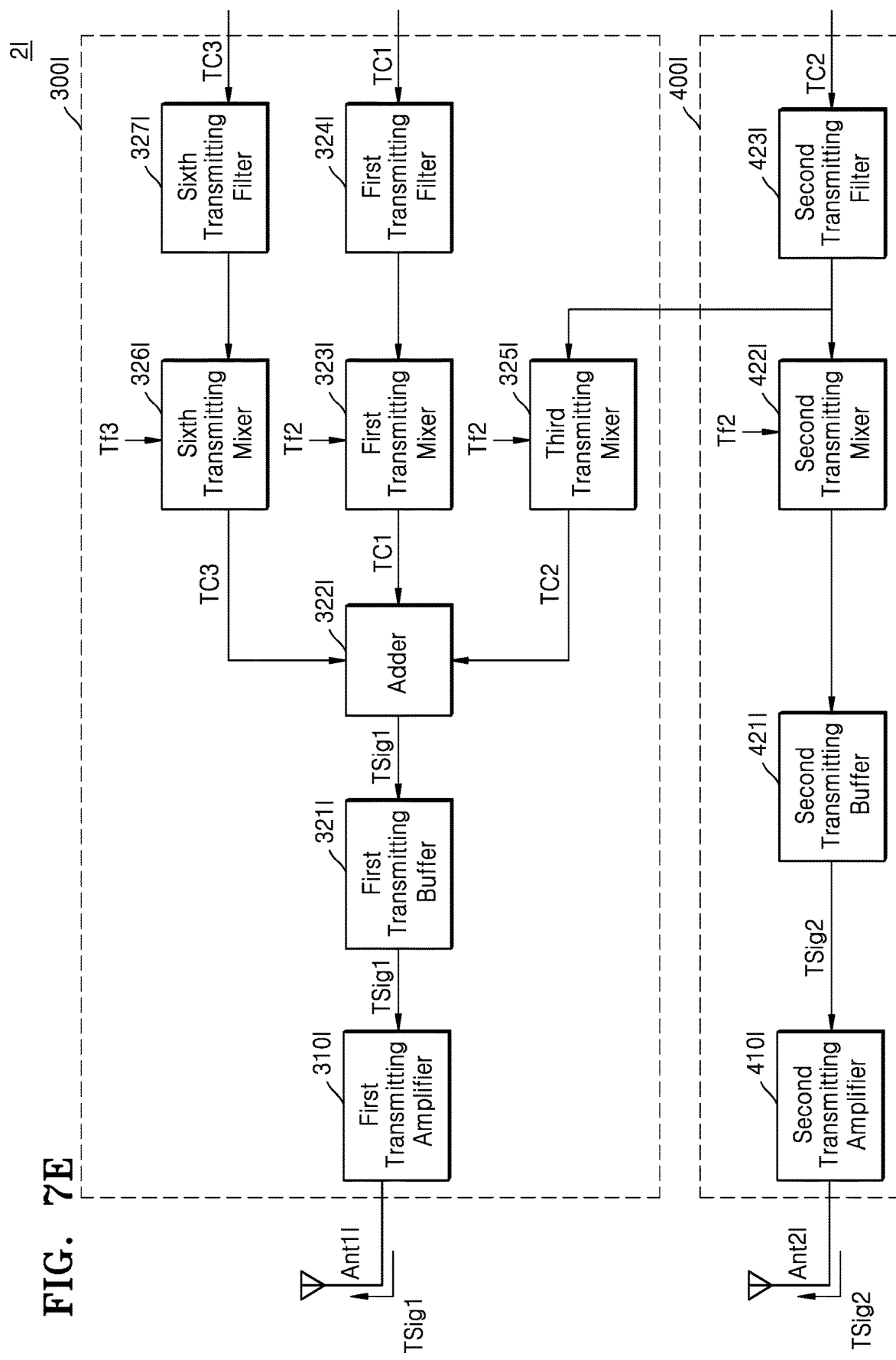
FIG. 7E is a block diagram illustrating a wireless communication device according to an embodiment.

FIG. 7E is a block diagram illustrating a wireless communication device 2l according to an embodiment. Contents overlapping with those given with reference to FIG. 7B are omitted for conciseness.

Referring to FIG. 7E, the wireless communication device 2l may include a first transmitter 300l and a second transmitter 400l. The first transmitter 300l may include a first transmitting amplifier 310l, a first transmitting buffer 321l, an adder 322l, a first transmitting mixer 323l, a first transmitting filter 324l, a third transmitting mixer 325l, a sixth transmitting mixer 326l, and a sixth transmitting filter 327l. The second transmitter 400l may include a second transmitting amplifier 410l, a second transmitting buffer 421l, a second transmitting mixer 422l, and a second transmitting filter 423l.

The sixth transmitting filter 327l may receive the third transmitting carrier signal TC3 and may filter the received third transmitting carrier signal TC3. The sixth transmitting filter 327l may output the filtered third transmitting carrier signal TC3 to the sixth transmitting mixer 326l. The sixth transmitting mixer 326l may up-convert the third transmitting carrier signal TC3 in the frequency domain based on the third transmitting frequency signal Tf3 and output the converted third transmitting carrier signal TC3 to the adder 322l. The adder 322l may generate the first transmitting signal TSig1 by combining the first transmitting carrier signal TC1 received from the first transmitting mixer 323l, the second transmitting carrier signal TC2 received from the third transmitting mixer 325l, and the third transmitting carrier signal TC3 received from the sixth transmitting mixer 326l.

In FIG. 7E, the adder 322l may be arranged at a rear end of the first transmitting buffer 321l, but this is merely an example, and in some embodiments, the adder 332l may be arranged at the front end of the first transmitting buffer 321l. In addition, FIG. 7E illustrates an embodiment in which the adder 322l combines all of the first transmitting carrier signal TC1, the second transmitting carrier signal TC2, and the third transmitting carrier signal TC3. However, in some embodiments, the first transmitting carrier signal TC1, the second transmitting carrier signal TC2, and the third transmitting carrier signal TC3 may be combined by using a plurality of adders 322l. In addition, FIG. 7E illustrates an embodiment in which the adder 322l combines three transmitting carrier signals, that is, TC1, TC2, and TC3, but in some embodiments, more than three transmitting carrier signals may be combined.

Figure 8:
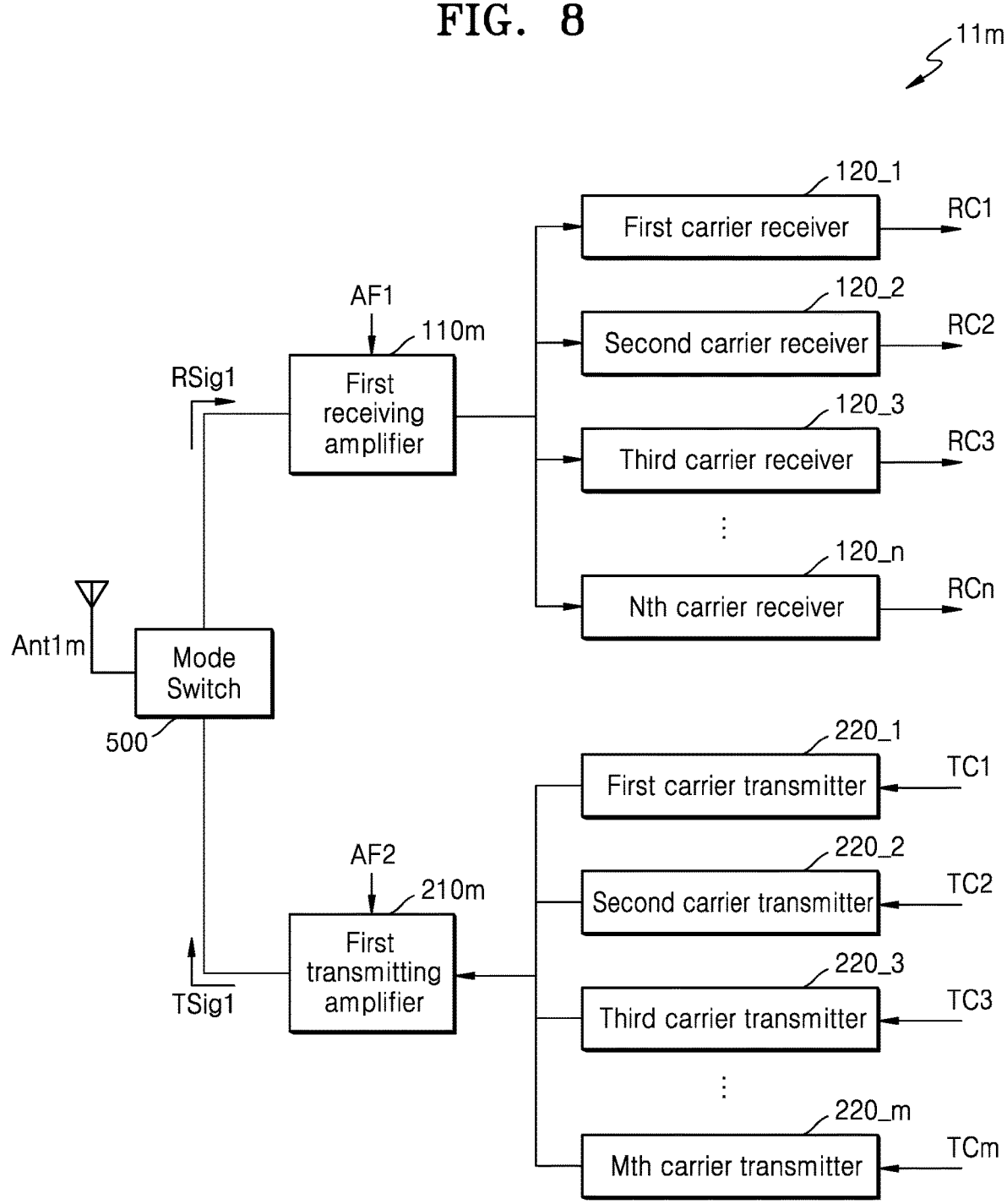
FIG. 8 is a block diagram illustrating a transceiver according to an embodiment.

FIG. 8 is a block diagram illustrating a transceiver 11m according to an embodiment. Contents overlapping with those given with reference to FIG. 2 are omitted for conciseness.

Referring to FIG. 8, the transceiver 11m may include the mode switch 500, a first receiving amplifier 110m, a first through $n^{th}$ carrier receivers 120_1 through 120_n, a first transmitting amplifier 210m, and a first through $m^{th}$ carrier transmitters 220_1 through 220_m. In the receiving mode, the first receiving amplifier 110m may receive the first receiving signal RSig1 and amplify the first receiving signal RSig1 based on a first amplifying value AF1. The first amplifying value AF1 may be determined based on the number of the first through third receiving carrier signals RC1 through RC3 and a fourth through $n^{th}$ receiving carrier signals RC4 through RCn. The first through $n^{th}$ carrier receivers 120_1 through 120_n may extract the first through $n^{th}$ received carrier signals RC1 through RCn from the amplified first receiving signal RSig1.

In the transmitting mode, the first through $m^{th}$ carrier transmitters 220_1 through 220_m may generate the first transmitting signal TSig1 by combining the first through third transmitting carrier signals TC1 through TC3 with fourth through $m^{th}$ transmitting carrier signals TC4 through TCm. The first transmitting amplifier 210m may receive the first transmitting signal TSig1 and amplify the first transmitting signal TSig1 based on a second amplifying value AF2. The second amplifying value AF2 may be determined based on the number of the first through $n^{th}$ transmitting carrier signals TC1 through TCn.

Figure 9:
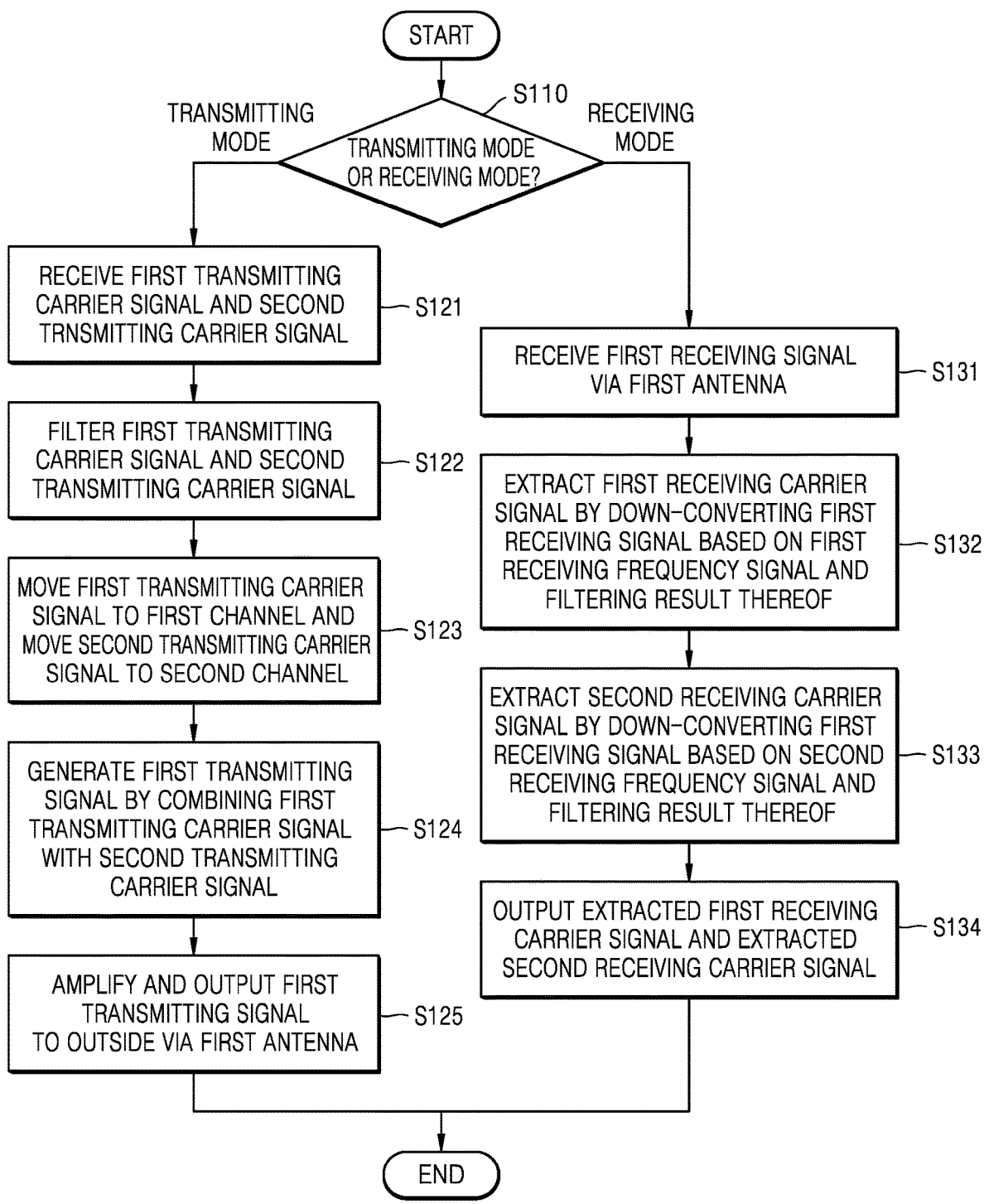
FIG. 9 is a flow chart of an operation of a transceiver according to an embodiment.

FIG. 9 is a flow chart of an operation of the first transceiver 11 according to an embodiment.

Referring to FIGS. 2 and 9, the first transceiver 11 may determine whether the first transceiver 11 is in the transmitting mode or the receiving mode (S110). In the transmitting mode, the first transceiver 11 may receive the first transmitting carrier signal TC1 and the second transmitting carrier signal TC2 (S121), and filter the received first transmitting carrier signal TC1 and the received second transmitting carrier signal (S122) to remove unwanted components. The first transceiver 11 may move the filtered first transmitting carrier signal TC1 in the frequency domain to the first channel CH1 by up-converting the filtered first transmitting carrier signal TC1 and move the filtered second transmitting carrier signal TC2 in the frequency domain to the second channel CH2 by up-converting the filtered second transmitting carrier signal TC2 (S123). The first transceiver 11 may generate the first transmitting signal TSig1 by combining the up-converted first transmitting carrier signal TC1 with the up-converted second transmitting carrier signal TC2 (S124). The first transceiver 11 may amplify the first transmitting signal TSig1 and output the amplified first transmitting signal TSig1 to the outside (for example, the second wireless communication device 3 in FIG. 1) via the first antenna Ant1_1 (S125).

In the receiving mode, the first transceiver 11 may receive the first receiving signal TSig1 via the first antenna Ant1_1 (S131). The first transceiver 11 may extract the first receiving carrier signal RC1 by down-converting the first receiving signal TSig1 based on the first receiving frequency signal Rf1 and filtering the down-converted first receiving signal TSig1 (S132). The first transceiver 11 may extract the second receiving carrier signal RC2 by down-converting the first receiving signal TSig1 based on the second receiving frequency signal Rf2 and filtering the down-converted first receiving signal TSig1 (S133). The first transceiver 11 may output the extracted first receiving carrier signal RC1 and the extracted second receiving carrier signal RC2 to the internal circuit (S134).

Figure 10:
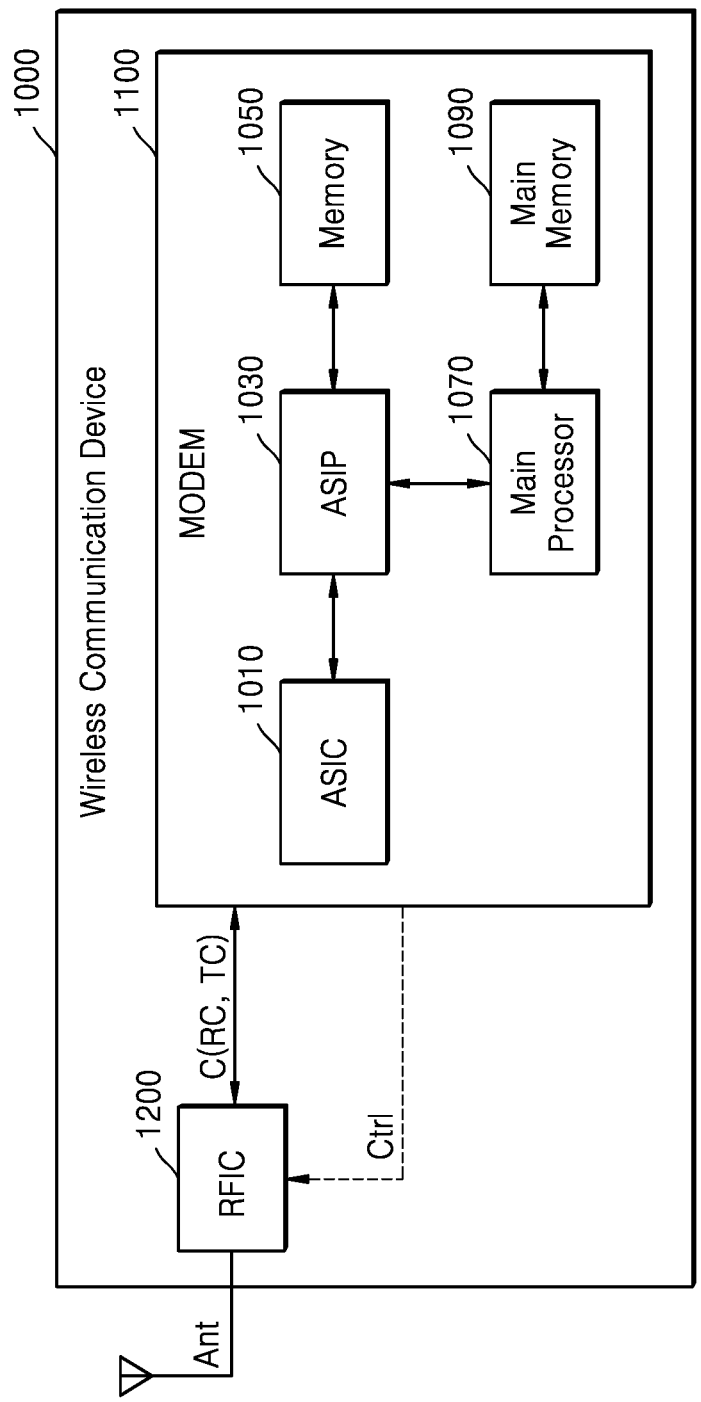
FIG. 10 is a block diagram illustrating a wireless communication device according to an embodiment.

FIG. 10 is a block diagram illustrating a wireless communication device 1000 according to an embodiment.

Referring to FIG. 10, the wireless communication device 1000 may include a modem 1100 and a radio frequency integrated circuit (RFIC) 1200. The modem 1100 may include an application specific integrated circuit (ASIC) 1010, an application specific instruction set processor (ASIP) 1030, a memory 1050, a main processor 1070, and a main memory 1090.

The RFIC 1200 may be connected to the antenna Ant to receive signals from the outside or transmit signals to the outside by using a wireless communication network. The RFIC 1200 may include a transceiver as described above with reference to FIGS. 1 through 9. The RFIC 1200 may exchange a plurality of carrier signals C with the modem 1100. According to various embodiments discussed above, the RFIC 1200 may receive a receiving signal using the CA via one antenna Ant based on a control signal Ctrl of the modem 1100, and may extract a plurality of receiving carrier signals RC. In addition, the RFIC 1200 may combine a plurality of transmitting carrier signals TC into a single transmitting carrier signal TC by using the CA based on the control signal Ctrl of the modem 1100 and output the combined single transmitting carrier signal TC to the outside via the antenna Ant. In one embodiment, the control signal Ctrl may include a frequency signal.

The ASIP 1030 may be an integrated circuit customized for a particular use, support a dedicated instruction set for a particular application, and execute instructions contained in the dedicated instruction set. The memory 1050 may communicate with the ASIP 1030 and may store, as a non-volatile storage, a plurality of instructions (i.e., program code) executed by the ASIP 1030. For example, the memory 1050 may include an arbitrary type memory accessible by the ASIP 1030, as a non-limiting example, such as a random access memory (RAM), a read-only memory (ROM), a tape, a magnetic disk, an optical disk, a volatile memory, a non-volatile memory, or a combination thereof.

The main processor 1070 may control the wireless communication device 1000 by executing a plurality of instructions. For example, the main processor 1070 may control the ASIC 1010 and the ASIP 1030, and may process data received via the wireless communication network or process user input to the wireless communication device 1000. The main memory 1090 may communicate with the main processor 1070 and may store, as a non-volatile storage, the plurality of instructions executed by main processor 1070. For example, the main memory 1090 may include an arbitrary type memory accessible by the main processor 1070, as a non-limited example, such as a RAM, a ROM, a tape, a magnetic disk, an optical disk, a volatile memory, a non-volatile memory, or a combination thereof.

As described above, embodiments have been disclosed in the drawings and specification. While example embodiments have been described herein with reference to specific terms, it should be understood that they have been used only for the purpose of describing the technical idea of the inventive concept and not for limiting the scope of the inventive concept as defined in the claims. Therefore, one with ordinary skill in the art will appreciate that various modifications and equivalent embodiments are possible without departing from the scope of the inventive concept. Therefore, the true scope of protection of the inventive concept should be determined by the technical idea as recited in the appended claims.

What is claimed is:

1. A wireless communication device for transceiving signals by using carrier aggregation, the wireless communication device comprising:
   a first antenna configured to transmit a first signal to an outside of the wireless communication device or receive a second signal from the outside;
   a first transmitter connected to the first antenna via a first node and configured to generate the first signal by combining a plurality of transmitting carrier signals received over a plurality of transmitting carriers; and
   a first receiver connected to the first antenna via the first node and configured to divide the second signal into a plurality of receiving carrier signals received over a plurality of receiving carriers,
   wherein the first receiver comprises a first receiving amplifier commonly connected to a plurality of carrier receivers configured to amplify the second signal received from the first antenna and to divide the amplified second signal into the plurality of receiving carrier signals, respectively,
   wherein the wireless communication device further comprises:
      a second antenna configured to receive a fourth signal from the outside;
      a second receiver connected to the second antenna and configured to extract a second receiving carrier signal from the fourth signal; and
      a fourth receiving mixer connected between the first receiver and the second receiver and configured to down-convert the second signal based on a second frequency signal and output the second signal that is down-converted to the second receiver, and
   wherein the second receiver comprises:
      a second receiving amplifier configured to amplify the fourth signal received from the second antenna;
      a third receiving mixer configured to down-convert the fourth signal based on the second frequency signal; and
      a third receiving filter connected to the third receiving mixer and the fourth receiving mixer at a third node and configured to extract the second receiving carrier signal from the fourth signal or the second signal.

2. The wireless communication device of claim 1, wherein the first transmitter comprises:
   a first carrier transmitter configured to up-convert a first transmitting carrier signal to a first channel and output the first transmitting carrier signal that is up-converted;

a second carrier transmitter configured to up-convert a second transmitting carrier signal to a second channel and output the second transmitting carrier signal that is up-converted;

an adder connected to the first carrier transmitter and the second carrier transmitter and configured to generate the first signal by combining the first transmitting carrier signal of the first channel with the second transmitting carrier signal of the second channel; and a first transmitting amplifier configured to amplify the first signal and output the first signal that is amplified to the first antenna.

3. The wireless communication device of claim 2, wherein the first carrier transmitter comprises:

a first transmitting filter configured to filter the first transmitting carrier signal;

a first transmitting mixer configured to up-convert the first transmitting carrier signal that is filtered to the first channel; and a first transmitting buffer configured to buffer the first transmitting carrier signal and output the first transmitting carrier signal that is buffered to the adder, wherein the second carrier transmitter comprises:

a second transmitting filter configured to filter the second transmitting carrier signal;

a second transmitting mixer configured to up-convert the second transmitting carrier signal that is filtered to the second channel; and a second transmitting buffer configured to buffer the second transmitting carrier signal and output the second transmitting carrier signal that is buffered to the adder.

4. The wireless communication device of claim 1, wherein the first receiver comprises:

a first carrier receiver connected to the first receiving amplifier via a second node and configured to extract a first receiving carrier signal of a third channel from the second signal; and a second carrier receiver connected to the first receiving amplifier via the second node and configured to extract the second receiving carrier signal of a fourth channel from the second signal.

5. The wireless communication device of claim 4, wherein the first carrier receiver comprises:

a first receiving buffer configured to buffer the second signal and output the second signal that is buffered;

a first receiving mixer configured to down-convert the second signal in a first channel based on a first frequency signal; and a first receiving filter configured to extract the first receiving carrier signal from the second signal, wherein the second carrier receiver comprises:

a second receiving buffer configured to buffer the second signal and output the second signal that is buffered;

a second receiving mixer configured to down-convert the second signal in a second channel based on the second frequency signal; and a second receiving filter configured to extract the second receiving carrier signal from the second signal.

6. The wireless communication device of claim 4, wherein the first receiver further comprises a first receiving buffer arranged between the second node and the second receiver and configured to buffer the first signal, and wherein the second receiver comprises:

a third receiving buffer configured to buffer the fourth signal and output the fourth signal that is buffered; and a multiplexer configured to selectively output to the third receiving mixer any one of the first signal received from the first receiving buffer and the fourth signal received from the third receiving buffer, and wherein the third receiving mixer is configured to extract a third receiving carrier signal from the fourth signal.

7. The wireless communication device of claim 1, wherein the second receiver further comprises a multiplexer connected to the third node and configured to selectively output any one of the fourth signal and the second signal to the third receiving filter.

8. The wireless communication device of claim 7, wherein a first signal path between the fourth receiving mixer and a first receiving buffer is shorter than a second signal path between the fourth receiving mixer and the multiplexer.

9. A wireless communication device for transceiving signals by using carrier aggregation, the wireless communication device comprising:

a first antenna configured to transmit a first signal to an outside of the wireless communication device or receive a second signal from the outside;

a first transmitter connected to the first antenna via a first node and configured to generate the first signal by combining a plurality of transmitting carrier signals received over a plurality of transmitting carriers; and a first receiver connected to the first antenna via the first node and configured to divide the second signal into a plurality of receiving carrier signals received over a plurality of receiving carriers, wherein the first receiver comprises a first receiving amplifier commonly connected to a plurality of carrier receivers configured to amplify the second signal received from the first antenna and to divide the amplified second signal into the plurality of receiving carrier signals, respectively, and wherein the wireless communication device further comprises:

a second antenna configured to transmit a third signal to the outside;

a second transmitter connected to the second antenna and configured to generate the third signal and output the third signal that is generated to the second antenna; and a third transmitting mixer connected between the first transmitter and the second transmitter, and configured to up-convert a second transmitting carrier signal received from the second transmitter to a second channel and output the second transmitting carrier signal that is up-converted to the first transmitter.

10. The wireless communication device of claim 9, wherein the first transmitter comprises:

a first transmitting filter configured to filter a first transmitting carrier signal;

a first transmitting mixer configured to up-convert the first transmitting carrier signal that is filtered to a first channel;

an adder connected to the first transmitting mixer and the third transmitting mixer and configured to generate the first signal by combining the first transmitting carrier signal with the second transmitting carrier signal; and a first transmitting buffer configured to buffer the first signal from the adder and output the first signal that is buffered.

11. The wireless communication device of claim 10, wherein the second transmitter comprises:

a second transmitting filter configured to filter the second transmitting carrier signal;

a second transmitting mixer configured to up-convert the second transmitting carrier signal that is filtered to the second channel;

a second transmitting buffer configured to buffer the third signal and output the third signal that is buffered; and a second transmitting amplifier configured to amplify the third signal and output the third signal that is amplified to the second antenna, wherein the third transmitting mixer is connected between the adder and the second transmitting filter.

12. The wireless communication device of claim 11, wherein a first signal path between the third transmitting mixer and the adder is shorter than a second signal path between the third transmitting mixer and the second transmitting filter.

13. A wireless communication device for transceiving signals by using carrier aggregation, the wireless communication device comprising:

a first antenna configured to transmit a first signal to an outside of the wireless communication device;

a first transmitter configured to up-convert a first transmitting carrier signal to a first channel and output the first transmitting carrier signal that is up-converted;

a second transmitter configured to up-convert a second transmitting carrier signal to a second channel and output the second transmitting carrier signal that is up-converted;

an adder configured to generate the first signal by combining the first transmitting carrier signal with the second transmitting carrier signal; and a first transmitting amplifier configured to amplify the first signal and output the first signal that is amplified to the first antenna, wherein the first transmitter comprises:

a first transmitting filter configured to filter the first transmitting carrier signal; and a first transmitting mixer configured to up-convert the first transmitting carrier signal that is filtered to the first channel and output the first transmitting carrier signal that is up-converted to the adder, wherein the second transmitter comprises:

a second transmitting filter configured to filter the second transmitting carrier signal; and a second transmitting mixer configured to up-convert the second transmitting carrier signal that is filtered to the second channel and output the second transmitting carrier signal that is up-converted to the adder, and wherein the wireless communication device further comprises:

a second antenna configured to transmit a second signal to the outside; and a third transmitting mixer configured to up-convert the second transmitting carrier signal to the second channel and output the second transmitting carrier signal that is up-converted to the second antenna, wherein the second transmitting filter is configured to output the second transmitting carrier signal that is filtered to the second transmitting mixer or to the third transmitting mixer.

* * * * *